United States Patent
Dubman et al.

(10) Patent No.: US 10,084,783 B2
(45) Date of Patent: Sep. 25, 2018

(54) SELECTIVELY RESTRICTING COMMUNICATIONS FROM THIRD PARTY APPLICATIONS/DEVICES TO ELECTRONIC DEVICES

(71) Applicant: Google Inc., Mountain View, CA (US)

(72) Inventors: Alex Dubman, San Mateo, CA (US); David W. Keith, Santa Clara, CA (US); Jiakang Lu, Mountain View, CA (US); Mark McBride, Santa Clara, CA (US); Rushabh Doshi, Foster City, CA (US)

(73) Assignee: Google LLC, Mountain View, CA (US)

( * ) Notice: Subject to any disclaimer, the term of this patent is extended or adjusted under 35 U.S.C. 154(b) by 186 days.

(21) Appl. No.: 14/312,637

(22) Filed: Jun. 23, 2014

(65) Prior Publication Data

US 2015/0373022 A1 Dec. 24, 2015

(51) Int. Cl.
*H04L 29/06* (2006.01)
*H04W 12/08* (2009.01)
*H04L 12/28* (2006.01)

(52) U.S. Cl.
CPC .......... *H04L 63/10* (2013.01); *H04L 12/2825* (2013.01); *H04W 12/08* (2013.01)

(58) Field of Classification Search
CPC ....................................................... H04L 63/10
See application file for complete search history.

(56) References Cited

U.S. PATENT DOCUMENTS

| | | | | |
|---|---|---|---|---|
| 6,628,337 B1* | 9/2003 | Yoshida | ............. | H04N 5/23241 348/372 |
| 6,697,617 B2* | 2/2004 | Liebenow | ......... | H04M 1/72519 455/425 |
| 6,721,580 B1* | 4/2004 | Moon | ............... | H04W 52/0261 455/574 |
| 7,434,109 B1 | 10/2008 | Stabile et al. | | |

(Continued)

OTHER PUBLICATIONS

"Notice of Allowance", U.S. Appl. No. 14/312,632, dated Feb. 15, 2017, 5 pages.

(Continued)

*Primary Examiner* — Kambiz Zand
*Assistant Examiner* — Thanh Le
(74) *Attorney, Agent, or Firm* — Colby Nipper

(57) ABSTRACT

A method for providing access to a target electronic device through a first service running on a different electronic device may include receiving in the first service a command directed to the target electronic device from a command sender and receiving in the service device operation status parameters of the target electronic device. The device operation status parameters may include properties of the target electronic device such as a battery level, a battery charging rate, an age, a planned lifespan, a recent wireless usage, an internal temperature, or any of the above in relation to an intervening electronic device over which communication to the target electronic device travels, or any combination thereof. The method may also include using the device operation status parameters to determine, using the service, (Continued)

whether to provide or not to provide an update signal incorporating the command or information to the target electronic device.

27 Claims, 16 Drawing Sheets

(56) References Cited

U.S. PATENT DOCUMENTS

| | | | |
|---|---|---|---|
| 7,702,349 B2 * | 4/2010 | Harris | H04W 72/005 455/466 |
| 9,660,948 B2 | 5/2017 | Dubman et al. | |
| 2008/0077989 A1 | 3/2008 | Bardsley et al. | |
| 2011/0276951 A1 | 11/2011 | Jain | |
| 2012/0115417 A1 * | 5/2012 | Moring | H04W 48/20 455/41.2 |
| 2014/0075030 A1 | 3/2014 | Wang et al. | |
| 2014/0085061 A1 * | 3/2014 | Shimizu | H04M 1/72533 340/12.5 |

OTHER PUBLICATIONS

"Restriction Requirement", U.S. Appl. No. 14/312,632, dated Feb. 9, 2016, 6 pages.
"Notice of Allowance", U.S. Appl. No. 14/312,632, dated Nov. 14, 2016, 6 pages.
"Non-Final Office Action", U.S. Appl. No. 14/312,632, dated Jun. 16, 2016, 9 pages.

* cited by examiner

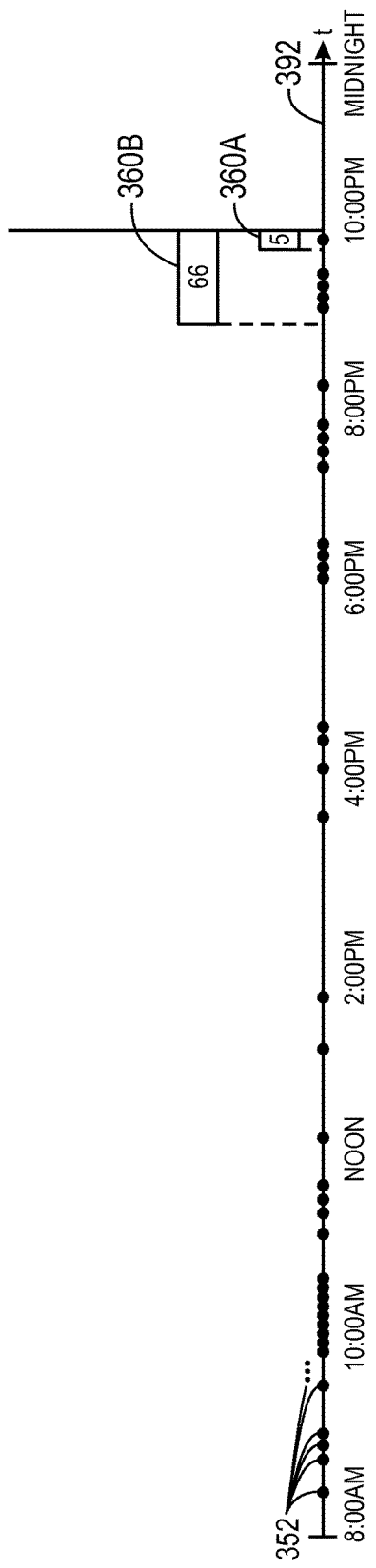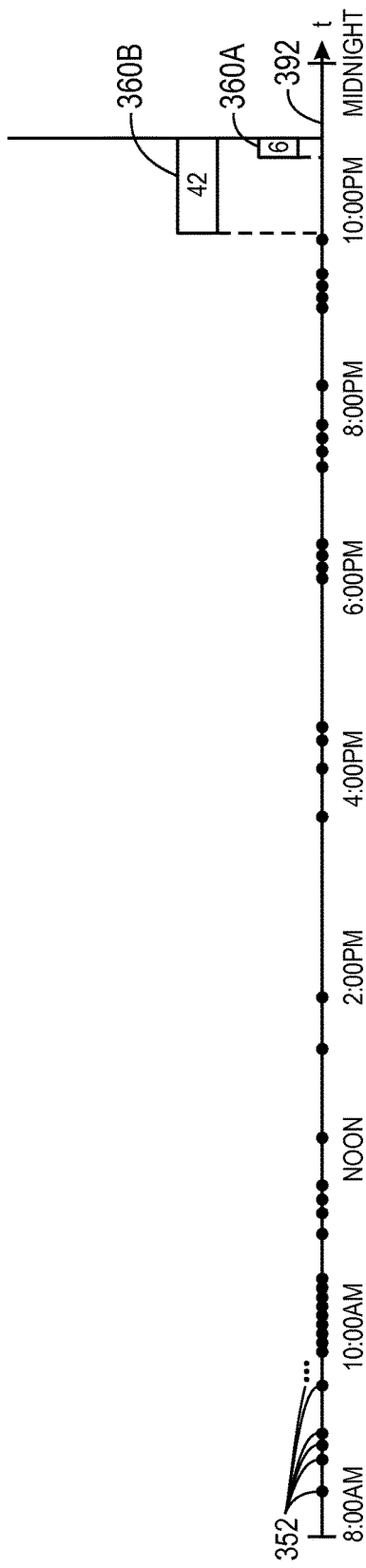

SELECTIVELY RESTRICTING COMMUNICATIONS FROM THIRD PARTY APPLICATIONS/DEVICES TO ELECTRONIC DEVICES

BACKGROUND

This disclosure relates to controlling access to electronic devices via application programming interface (API) restrictions, and more specifically to device-state-based message limiting and/or rule-based rate limiting of access to an electronic device to preserve a user experience with the electronic device This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

People interact with a number of different electronic devices on a daily basis. In a home setting, for example, a person may interact with smart thermostats, lighting systems, alarm systems, entertainment systems, and a variety of other electronic devices. To interact with some of these electronic devices, a person may communicate a command using an application program running on another electronic device. For instance, a person may control the temperature setting on a smart thermostat using an application program running on a smartphone. The application program may communicate with a secure online service that interacts with that thermostat.

To preserve the user experience associated with an electronic device, the manufacturer of the electronic device may also develop the application programs to control the electronic device. Opening access to the electronic devices to third-party developers, however, may potentially improve the experience of some people with the devices—but only if third-party application programs do not cause the electronic devices to behave in an undesirable manner. Moreover, even electronic devices of the same type may have characteristics (e.g., battery level and/or charging rate) that vary among different installations of the devices. For instance, some smart thermostats may recharge internal batteries using a main 120V or 240V building power supply, while others of the same type may recharge batteries using a much more limited supply of power. Thus, allowing third party developers unfettered access to these electronic devices introduces a risk that the operation of some of the electronic devices, and thus the user experience associated with those devices, may suffer.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

According to embodiments of this disclosure, device-state-based message limiting and/or rule-based rate limiting may enable third-party applications to access different installations of devices (e.g., via an application programming interface (API)) without potentially negatively impacting the operation of, and thus the user experience with, those devices. Namely, the third-party applications may communicate not directly with a target device (e.g., a smart home device such as a smart thermostat), but rather through a device service. The device service may perform device-state-based message limiting by deciding whether to provide or not to provide a corresponding update signal to the target device based on one or more factors such as an operation status parameter of the device.

Such an operation status parameter may include, for example, a current battery level, charging rate, device age, planned device lifespan, recent wireless usage, internal temperature, and/or the operation status parameters of other connected devices that are being used to access the smart home device. Since parameters like these may vary from device to device—even for devices of the same type and/or within the same smart-home environment—the device service may tailor device-state-based message limiting of communication to different devices according to their (possibly unique) operation status parameters.

Additionally or alternatively, the device service may rate-limit the number of incoming messages to prevent the target device, the device service itself, or both, from becoming overwhelmed with certain messages according to parameterized rules. This rule-based rate limiting may involve determining parameters of the messages and rate-limiting the messages according to the rules that involve the same parameters. For example, messages may be parsed to determine which instance of an application and/or which unique user sent the message. Rules may be defined according to these parameters. An application instance and/or a user may be permitted, for example, to send only so many messages during any given first time period (e.g., 20 messages per minute) and any given second time period (e.g., 60 messages per hour). Thus, messages having parameters that match the parameters of a rule may be counted using a sliding window counter that counts those messages received within some specified amount of time (e.g., within the last minute or within the last hour). When the count of a sliding window counter exceeds a certain limit (e.g., a count of 20 messages received within the last minute), the device service may take a restrictive action. For example, the device service may block, redirect, or delay the message, and/or may respond to the sender of the message with an error or warning message.

Using rule-based rate limiting, the device service may enable messages to be rate-limited in a highly extendable way. Indeed, any suitable number of rules may be generated based on any suitable number of parameters that may be parsed and/or ascertained from the messages received by the device service. Moreover, in certain examples, message tracking (e.g., counting messages with parameters that match certain rules using sliding window counters) may take place asynchronously to the receipt of the messages, while message restriction (e.g., performing a restrictive action when the number of messages in a sliding window exceeds a limit) may take place substantially synchronously. This may reduce the latency that rate limiting can introduce. Namely, asynchronous message tracking may be used to determine whether to restrict future messages having certain parameters (e.g., by causing the device service to take a restrictive action when a sliding window count of such messages exceeds a limit). By making the decision of whether to restrict certain types of messages asynchronously, the processing time for making this decision does not hold up the message as it passes through the device service. In one particular example, asynchronous message tracking may involve maintaining a sliding window count of messages deriving from a particular instance of an application associated with a particular user. The sliding window count may be updated as messages from the application/user are received without slowing the passage of the message while the count is updated. When the sliding window count exceeds a certain limit, however, a synchronous restriction flag may be set. The synchronous restriction flag may cause the messages to be synchronously restricted (e.g., to cause the device service to take certain restrictive action). This may permit even very complex rule-based rate limiting while reducing the amount of latency that such complex rate-limiting rules would introduce.

In one embodiment, a method for providing access to a target electronic device through a first service running on a different electronic device may include receiving in the first service a command or information directed to the target electronic device from a command or information sender and receiving in the service one or more device operation status parameters of the target electronic device. The one or more device operation status parameters of the target electronic device may include a battery level of the target electronic device, a battery charging rate of the target electronic device, an age of the target electronic device, a planned lifespan of the target electronic device, a recent wireless usage of the target electronic device, an internal temperature of the target electronic device, or any of the above in relation to an intervening electronic device over which communication to the target electronic device travels, or any combination thereof. The method may also include using the one or more device operation status parameters to determine, using the service, whether to provide or not to provide an update signal incorporating the command or information to the target electronic device.

In another embodiment, a tangible, non-transitory computer-readable medium may include instructions to receive a device request message targeted to a first smart home device accessible via a device service, determine a first battery threshold based at least in part on a charging rate of a battery of the first smart home device, and compare a battery level of the first target smart home device with the first battery threshold. The instruction may then provide an update signal from the device service to the first smart home device only when the battery level exceeds the first threshold, such that the update signal incorporates at least partly the device request message.

In yet another embodiment, an electronic device may include a sensor to sense a property of an environment of the electronic device, a processor to vary an operation of the electronic device based at least in part on the property sensed by the sensor, and a network interface to communicate over a network with a single device service. To communicate with the device service may include sending an outgoing message that includes one or more operation status parameters of the electronic device and receiving an incoming control message from the device service at a rate limited based at least in part on the one or more operation status parameters.

In yet another embodiment, a method may include receiving in a device service running on a server electronic device from a first program or first program service associated with the first program, a first device request message targeted to a first electronic device accessible via the device service. The method may also include receiving in a device service running on a server electronic device from a second program or second program service associated with the second program, a second device request message targeted to the first electronic device accessible via the device service. The method may then include determining, based at least in part on one or more operation status parameters, whether to provide or not to provide an update signal that incorporates the first and second device request messages to the first electronic device. Here, the one or more operation status parameters may include a battery level of the first target electronic device, a battery charging rate of the first target electronic device, an age of the first target electronic device, a planned lifespan of the first target electronic device, a recent wireless usage of the first target electronic device, an internal temperature of the first target electronic device, or any of the above in relation to an intervening electronic device over which communication to the first target electronic device travels, or any combination thereof.

In yet another embodiment, an electronic device may include a sensor to sense a property of an environment of the electronic device, a processor to vary an operation of the electronic device based at least in part on the property sensed by the sensor and determine when to limit external communication with the electronic device based at least in part on one or more operation status parameters of the electronic device, and a network interface to communicate over a network with a single device service. To communicate with the device service includes sending an outgoing message that includes an indication of the limit determination.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 16A-B are diagrams representing sliding window counters of messages received over time, in accordance with an embodiment;

DETAILED DESCRIPTION OF SPECIFIC EMBODIMENTS

Figure 1:
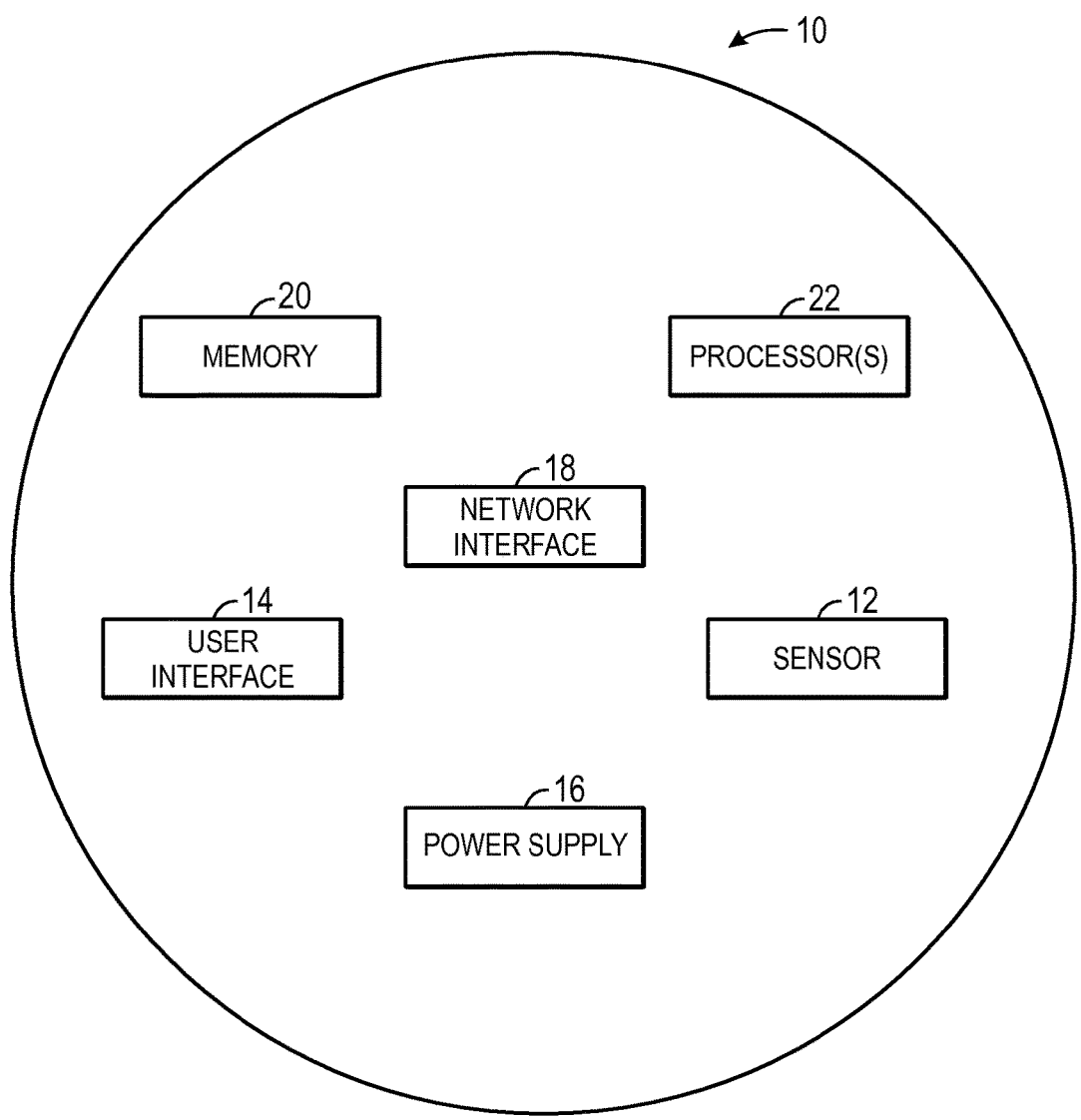
FIG. 1 is a block diagram of a smart home device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A number of smart home devices may serve the inhabitants of a home. For example, a smart thermostat, such as the Nest® Learning Thermostat by Nest Labs, Inc. (a company of Google, Inc.), may learn the inhabitants' behavior and adjust the temperature to suit their preferences. A smart hazard detector, such as the Nest® Protect by Nest Labs, may communicate with other smart home devices while performing hazard detection functions to keep the inhabitants safe. While it may be possible for users to interact with the smart home devices directly, e.g., via a user interface on the smart thermostat or a button on the smart hazard detector, it may also be possible for users to interact with the smart home devices indirectly, e.g., via an application executing on a mobile device such as a smartphone, via an application executing on a centralized home automation controller, via an application executing within a dashboard of a vehicle, etc. While it is clearly desirable and, in my cases, typical, for the same entity that designs, manufactures, and sells the smart home devices themselves to also design and distribute technologies for indirect control of those smart home devices, it may also be desirable for that entity to enable other entities to design and distribute technologies for indirect control of those smart home devices. For example, by opening up monitoring and control of those smart home devices to third parties, innovative uses of those smart home devices and levels of integration of those devices with (what may initially be perceived as) entirely unrelated devices may advantageously be realized so as to facilitate consumer benefits and technology synergies that may have gone unrealized absent such collaboration.

However, providing third parties with unrestricted access to interact with the smart home devices may disadvantageously result in unintended—and potentially undesirable—consequences. For example, unfettered access may cause the smart home devices to behave in an unsatisfactory manner, fail to operate as intended, or otherwise result in an undesirable user experience. In some particular instances, smart home devices may be particularly power conscious. For example, smart thermostats may have relatively low capacity rechargeable batteries coupled with a relatively low current recharging source. For another example, smart hazard detectors may only be equipped with non-rechargeable batteries while it is desired to maximize the lifetime of those batteries. Notwithstanding these power limitations, it should be appreciated that interactions with the smart home devices may necessarily require consumption of electrical energy by those devices. For example, requesting a current indoor temperature from a smart thermostat via an indirect monitoring device may require the smart thermostat to transition from a sleep mode to an awake mode, actuate a processor to obtain sensor measurements, and/or enable a Wifi chip to wirelessly communicate those sensor measurements to the indirect monitoring device. Similarly, setting a current setpoint temperature on the smart thermostat via an indirect monitoring device may require the smart thermostat to transition from a sleep mode to an awake mode, enable a Wifi chip to wirelessly receive the desired setpoint temperature from the indirect monitoring device, and/or actuate a processor configure operation of the smart thermostat in accordance with the desired setpoint temperature.

According to embodiments of this disclosure, device-state-based message limiting may enable third-party devices and/or applications to access smart home devices (e.g., via an application programming interface (API)) while reducing the likelihood that the third-party interaction will negatively impact operation of and thus the user experience with those devices. In some embodiments, the third-party devices and/or applications may communicate directly with the smart home device via either a wired or wirelessly connection. In other embodiments, however, the third-party devices and/or applications may communicate indirectly with a smart home device via a cloud-based device service. In either case, device-state-based message limiting may be imposed on the third-party devices and/or applications (via, e.g., the smart home device itself, the API, the cloud-based device service, etc.) based on operation status parameters of the device. The operation status parameters generally characterize current, historical, and/or future operational characteristics of the smart home device, and may include, for example, a current battery level, charging rate, device age, planned device lifespan, recent wireless usage, internal temperature, current operation of the device (e.g., sleeping, awake, Wifi active/inactive, executing a demand-response algorithm, executing a time-to-temperature algorithm, etc.), and/or the current, historical, and/or future operational characteristics of other connected devices associated with the smart home environment.

Such device-state-based message limiting may be implemented in any one or more of a number of different fashions. For example, it may be implemented as a limit in the number of communications sent from the cloud-based device service to the smart home device on behalf of the third party device/application in a given period of time, the number of communications sent from the third party device/application to the smart home device via the API in a given period of time, the number of communications received and/or processed by the smart home device that were sent from a third party device/application, etc.

In one particular example, device-state-based message limiting may be imposed on communications sent to a smart home device from a cloud-based service based on a battery level of the smart home device. Specifically, to ensure that third-party communications targeted to a particular device do not cause the battery level to drain too quickly, the device service may only provide a corresponding update signal to the device when the battery level is sufficiently high in relation to the charging rate of the battery. Similarly, if the smart home device does not have a rechargeable battery, the battery level may be compared against the current age of the device and its planned lifespan. The device service may or may not provide the device update signal based on whether the battery level is likely to allow the device to meet or exceeds its planned lifespan.

It should be appreciated that limiting communication to a single maximum rate of communication (e.g., 1 session per minute) may not suffice for all devices. That is, different devices (even those of the same type, such as installations of smart hazard detectors throughout a house) may behave much differently even with communication limited to the same maximum rate. For example, some smart home devices may have a dedicated 120V or 240V power supply by which the batteries of these devices can charge. These devices may support, under many conditions, a relatively high device access rate. On the other hand, some smart home devices may have a very limited power supply by which the batteries of these devices can charge (or may not even be rechargeable at all). A relatively high device access rate could cause the batteries to drain too fast to be replenished for normal usage. Accordingly, these devices may not be able to support the same relatively high device access rate without increasing the risk that device operation may be negatively impacted.

Additionally or alternatively, the device service may rate-limit the number of incoming messages to prevent the target device, the device service itself, or both, from becoming overwhelmed with certain messages according to parameterized rules. This rule-based device-state-based message limiting may involve determining parameters of the messages and rate-limiting the messages according to the rules that involve the same parameters. For example, messages may be parsed to determine which instance of an application and/or which unique user sent the message. Rules may be defined according to these parameters. An application instance and/or a user may be permitted, for example, to send only so many messages during any given first time period (e.g., 20 messages per minute) and any given second time period (e.g., 60 messages per hour). Thus, messages having parameters that match the parameters of a rule may be counted using a sliding window counter that counts those messages received within some specified amount of time (e.g., within the last minute or within the last hour). When the count of a sliding window counter exceeds a certain limit (e.g., a count of 20 messages received within the last minute), the device service may take a restrictive action. For example, the device service may block, redirect, or delay the message, and/or may respond to the sender of the message with an error or warning message.

Using rule-based device-state-based message limiting, the device service may enable messages to be rate-limited in a highly extendable way. Indeed, any suitable number of rules may be generated based on any suitable number of parameters that may be parsed and/or ascertained from the messages received by the device service. Moreover, in certain examples, message tracking (e.g., counting messages with parameters that match certain rules using sliding window counters) may take place asynchronously to the receipt of the messages, while message restriction (e.g., performing a restrictive action when the number of messages in a sliding window exceeds a limit) may take place substantially synchronously. This may reduce the latency that device-state-based message limiting can introduce. Namely, asynchronous message tracking may be used to determine whether to restrict future messages having certain parameters (e.g., by causing the device service to take a restrictive action when a sliding window count of such messages exceeds a limit). By making the decision of whether to restrict certain types of messages asynchronously, the processing time for making this decision does not hold up the message as it passes through the device service. In one particular example, asynchronous message tracking may involve maintaining a sliding window count of messages deriving from a particular instance of an application associated with a particular user. The sliding window count may be updated as messages from the application/user are received without slowing the passage of the message while the count is updated. When the sliding window count exceeds a certain limit, however, a synchronous restriction flag may be set. The synchronous restriction flag may cause the messages to be synchronously restricted (e.g., to cause the device service to take certain restrictive action). This may permit even very complex rule-based device-state-based message limiting while reducing the amount of latency that such complex rate-limiting rules would introduce.

The Smart Home Environment

The various systems, methods, devices, and computer program products of this disclosure may be used to maintain a level of quality of the user experience for any suitable number and type of electronic devices. This disclosure will describe device-state-based message limiting and rule-based device-state-based message limiting in the context of a smart home environment that includes at least one smart home device. The systems, methods, devices, and computer program products of this disclosure, however, may provide substantial benefits to communication with any suitable electronic devices in any suitable environment. In other words, performing device-state-based message limiting and/or rule-based device-state-based message limiting may be used in any suitable number of contexts, whether in a smart home environment or otherwise.

By way of introduction, FIG. 1 is a block diagram of one example of a smart home device 10. In one embodiment, the smart home device 10 may include one or more sensors 12, a user-interface component 14, a power supply 16 (e.g., including a power connection and/or battery), a network interface 18, memory 20, and one or more processors 22. These components are intended to be representative and are not intended to be exhaustive. By way of example, the smart home device 10 may be a Nest® Learning Thermostat—1st Generation T100577, a Nest® Learning Thermostat—2nd Generation T200577, or a Nest® Protect, each of which is made by Nest Labs, Inc., a company of Google, Inc.

The sensor(s) 12 may detect various properties of the environment of the smart home device 10, and/or properties of the smart home device 10 itself. These may include acceleration, temperature (indoor temperature, device temperature, etc.), humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensor(s) 12 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s) or radiofrequency identification detector(s), etc. In some instances, the smart home device 10 may include one or more primary sensors and one or more secondary sensors. For example, the primary sensor(s) may sense data central to the core operation of the device (e.g., sensing a temperature in a thermostat or sensing smoke in a smoke detector), while the secondary sensor(s) may sense other types of data (e.g., motion, light or sound), which can be used for energy-efficiency objectives or smart-operation objectives.

One or more user-interface components 14 in the smart home device 10 may receive input from the user and/or present information to the user when the user interacts in person with the smart home device 10. For example, the user may mechanically move a sliding component (e.g., along a vertical or horizontal track) or rotate a rotatable ring (e.g., along a circular track) to adjust a temperature setting. The power-supply component 16 may include a power connection and/or a local battery. For example, the power connection may connect the smart home device 10 to a power source such as a line voltage source. In some instances, an AC power source can be used to repeatedly charge a (e.g., rechargeable) local battery, such that the battery may be used later to supply power to the smart home device 10 when the AC power source is not available. In cases where the smart home device 10 does not have access to an external supply of power, the power-supply component 16 may be a non-rechargeable battery that is sized appropriately to last at least as long as a planned lifespan of the smart home device under normal operating conditions. The network interface 18 may include a component that enables the smart home device 10 to communicate between devices. As such, the network interface 18 may enable the smart home device 10 to communicate with other devices 10 via a wired or wireless network. The network interface 18 may include a wireless card or some other transceiver connection to facilitate this communication. In some embodiments, the network interface 18 may includes multiple networking components to facilitate communications over a variety of networking protocols and/or communication architectures. For example, the network interface 18 may include multiple wireless communication components, such as a low-power wireless communication component (e.g., an IEEE 802.15.4. wireless transceiver) and a high-power wireless communication component (e.g., an IEEE 802.11 wireless transceiver). In at least one embodiment, in a sleep mode, the high-power wireless communication component may be disabled or otherwise inoperative, while the low-power wireless communication component may listen for communications to the device 10. Upon receiving some communications, in at least one embodiment, the low-power wireless communication component may perform an initial analysis on the received communication and determine whether to wake-up the device 10 (e.g., actuate the high-power processor or other processor to perform some operation based on the received communication).

Memory 20 may store instructions to execute on the processor(s) 22. In one example, the memory 20 may include an article of manufacture such as flash memory, a hard drive, random access memory, or the like. The processor(s) 22 may include a general-purpose processor that carries out computer code stored in the memory device 20, a special-purpose processor or application-specific integrated circuit, or some combination of these. The processor(s) 22 may also represent any other suitable type of hardware/firmware/software processing platforms. In certain embodiments, the processor(s) 22 includes a high-power processor that may execute computationally intensive operations, such as operating the user-interface component 14 and the like, and a low-power processor that may manage less complex processes such as detecting a hazard or temperature from the sensor 12. In one embodiment, the low-power processor may wake or initialize the high-power processor for computationally intensive processes.

By way of example, when the processor(s) 22 includes both a high-power processor and a low-power processor, the low-power processor may detect when a location (e.g., a house or room) is occupied (i.e., includes a presence of a human) and/or whether it is occupied by a specific person or is occupied by a specific number of people (e.g., relative to one or more thresholds). In one embodiment, this detection can occur by analyzing microphone signals, detecting user movements (e.g., in front of a device), detecting openings and closings of doors or garage doors, detecting wireless signals, detecting an internet protocol (IP) address of a received signal, detecting operation of one or more devices within a time window, or any other suitable techniques. The high-power processor and the low-power processor may include image recognition technology to identify particular occupants or objects. In certain embodiments, the high-power processor and the low-power processor may detect the presence of a human using a passive infrared (PIR) sensor 24.

In some instances, the high-power processor of the processor(s) 22 may predict desirable settings and/or implement those settings. For example, based on the presence detection, the high-power processor may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the high-power processor may initiate an audio or visual indicator of where the person, animal or object is or may initiate an alarm or security feature if an unrecognized person is detected under certain conditions (e.g., at night or when lights are off).

In some instances, devices may interact with each other such that events detected by a first device influences actions of a second device. For example, a first device can detect that a user has entered into a garage (e.g., by detecting motion in the garage, detecting a change in light in the garage or detecting opening of the garage door). The first device can transmit this information to a second device via the network interface 18, such that the second device can, e.g., adjust a home temperature setting, a light setting, a music setting, and/or a security-alarm setting. As another example, a first device can detect a user approaching a front door (e.g., by detecting motion or sudden light pattern changes). The first device may, e.g., cause a general audio or visual signal to be presented (e.g., such as sounding of a doorbell) or cause a location-specific audio or visual signal to be presented (e.g., to announce the visitor's presence within a room that a user is occupying).

Figure 2:
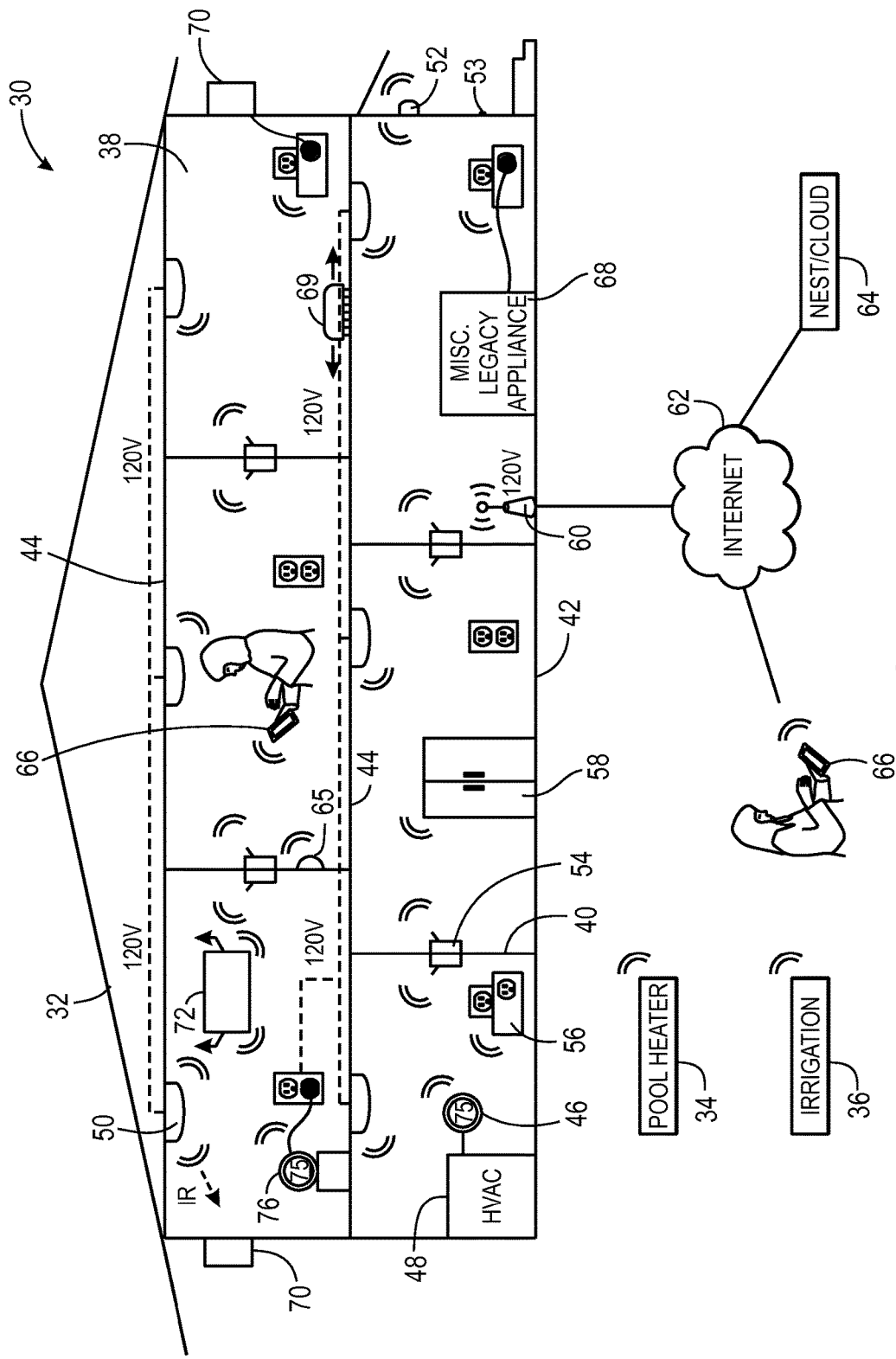
FIG. 2 is a block diagram of a connected smart home environment that includes a number of smart home devices, in accordance with an embodiment.

Keeping the foregoing in mind, FIG. 2 illustrates an example of a smart-home environment 30 within which one or more of the smart home devices 10 of FIG. 1, methods, systems, services, and/or computer program products described further herein can be applicable. The depicted smart-home environment 30 includes a structure 32, which can include, e.g., a house, office building, garage, or mobile home. It will be appreciated that devices can also be integrated into a smart-home environment 30 that does not include an entire structure 32, such as an apartment, condominium, or office space. Further, the smart home environment can control and/or be coupled to devices outside of the actual structure 32. Indeed, several devices in the smart home environment need not physically be within the structure 32 at all. For example, a device controlling a pool heater or irrigation system can be located outside of the structure 32. Notwithstanding the provision of a smart-home environment 30 and subsequent description of various embodiments of accessing electronic devices provided within the smart-home environment 30, it should be appreciated that the various rate limiting techniques described herein may be similarly applicable to non-smart-home environments. For example, it may be desirable to apply similar rate limiting techniques to mobile devices (e.g., wearables such as smart phones, smart glasses, smart watches, smart shoes, etc.), in-vehicle electronics (e.g., car navigation units, radar detectors, audio/radio components, etc.), or other electronic devices outside of the smart-environment environment 30.

The depicted structure 32 includes a number of rooms 38, separated at least partly from each other via walls 40. The walls 40 can include interior walls or exterior walls. Each room can further include a floor 42 and a ceiling 44. Devices can be mounted on, integrated with and/or supported by a wall 40, floor 42 or ceiling 44.

In some embodiments, the smart-home environment 30 of FIG. 2 includes a number of smart home devices 10, including intelligent, multi-sensing, network-connected devices, that can integrate seamlessly with each other and/or with a central server or a cloud-computing system to provide any of a variety of useful smart-home objectives. The smart-home environment 30 may include one or more intelligent, multi-sensing, network-connected thermostats 46 (hereinafter referred to as "smart thermostats 46"), one or more intelligent, network-connected, multi-sensing hazard detection units 50 (hereinafter referred to as "smart hazard detectors 50"), and one or more intelligent, multi-sensing, network-connected entryway interface devices 52 (hereinafter referred to as "smart doorbells 52"), and one or more intelligent, network-connected door locks 53 (hereinafter referred to as "smart door locks 53"). According to embodiments, the smart thermostat 46 may include a Nest® Learning Thermostat—1st Generation T100577 or Nest® Learning Thermostat—2nd Generation T200577 by Nest Labs, Inc., among others. The smart thermostat 46 detects ambient climate characteristics (e.g., temperature and/or humidity) and controls a HVAC system 48 accordingly.

The smart hazard detector 50 may detect the presence of a hazardous substance or a substance indicative of a hazardous substance (e.g., smoke, fire, or carbon monoxide). The smart hazard detector 50 may include a Nest® Protect that may include sensor(s) 12 such as smoke sensors, carbon monoxide sensors, and the like. As such, the hazard detector 50 may determine when smoke, fire, or carbon monoxide may be present within the building.

The smart doorbell 52 may detect a person's approach to or departure from a location (e.g., an outer door), control doorbell functionality, announce a person's approach or departure via audio or visual means, or control settings on a security system (e.g., to activate or deactivate the security system when occupants go and come). The smart doorbell 52 may interact with other devices 10 based on whether someone has approached or entered the smart-home environment 30. The smart door locks 53 may detect and toggle between a locked and unlocked condition for doors in the home, detect a person's approach to or departure from a respective door, detect whether a door is open or closed, or other suitable controls associated with a smart door lock 53.

In some embodiments, the smart-home environment 30 further includes one or more intelligent, multi-sensing, network-connected wall switches 54 (hereinafter referred to as "smart wall switches 54"), along with one or more intelligent, multi-sensing, network-connected wall plug interfaces 56 (hereinafter referred to as "smart wall plugs 56"). The smart wall switches 54 may detect ambient lighting conditions, detect room-occupancy states, and control a power and/or dim state of one or more lights. In some instances, smart wall switches 54 may also control a power state or speed of a fan, such as a ceiling fan. The smart wall plugs 56 may detect occupancy of a room or enclosure and control supply of power to one or more wall plugs (e.g., such that power is not supplied to the plug if nobody is at home).

Still further, in some embodiments, the smart home device 10 within the smart-home environment 30 may further includes a number of intelligent, multi-sensing, network-connected appliances 58 (hereinafter referred to as "smart appliances 58"), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to embodiments, the network-connected appliances 58 are made compatible with the smart-home environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 68, such as old conventional washer/dryers, refrigerators, and the like which can be controlled, albeit coarsely (ON/OFF), by virtue of the smart wall plugs 56. The smart-home environment 30 can further include a variety of partially communicating legacy appliances 70, such as infrared ("IR") controlled wall air conditioners or other IR-controlled devices, which can be controlled by IR signals provided by the smart hazard detectors 50 or the smart wall switches 54.

According to embodiments, the smart thermostats 46, the smart hazard detectors 50, the smart doorbells 52, the smart door locks 53, the smart wall switches 54, the smart wall plugs 56, and other devices of the smart-home environment 30 are modular and can be incorporated into older and new houses. For example, the smart home devices 10 are designed around a modular platform consisting of two basic components: a head unit and a back plate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensor(s) 12, processor(s) 22, user interfaces 14, the power supply 16, the network interface 18, and other functional components of the devices described above.

Many different commercial and functional possibilities for provisioning, maintenance, and upgrade are possible. For example, after years of using any particular head unit, a user will be able to buy a new version of the head unit and simply plug it into the old docking station. There are also many different versions for the head units, such as low-cost versions with few features, and then a progression of increasingly-capable versions, up to and including extremely fancy head units with a large number of features. Thus, it should be appreciated that the various versions of the head units can all be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a back room or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room", "kitchen" and so forth.

The smart-home environment 30 may also include communication with devices outside of the physical home but within a proximate geographical range of the home. For example, the smart-home environment 30 may include a pool heater monitor 34 that communicates a current pool temperature to other devices within the smart-home environment 30 or receives commands for controlling the pool temperature. Similarly, the smart-home environment 30 may include an irrigation monitor 36 that communicates information regarding irrigation systems within the smart-home environment 30 and/or receives control information for controlling such irrigation systems. According to embodiments, an algorithm is provided for considering the geographic location of the smart-home environment 30, such as based on the zip code or geographic coordinates of the home. The geographic information is then used to obtain data helpful for determining optimal times for watering, such data may include sun location information, temperature, dewpoint, soil type of the land on which the home is located, etc.

By virtue of network connectivity, one or more of the smart-home devices of FIG. 2 can further allow a user to interact with the device even if the user is not proximate to the device. For example, a user can communicate with a device using a computer (e.g., a desktop computer, laptop computer, or tablet) or other portable electronic device (e.g., a smartphone) 66. A web page or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

As discussed, users can control the smart thermostat and other smart devices in the smart-home environment 30 using a network-connected computer or portable electronic device 66. In some examples, some or all of the occupants (e.g., individuals who live in the home) can register their device 66 with the smart-home environment 30. Such registration can be made at a central server to authenticate the occupant and/or the device as being associated with the home and to give permission to the occupant to use the device to control the smart devices in the home. An occupant can use their registered device 66 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 66, the smart-home environment 30 makes inferences about which individuals live in the home and are therefore occupants and which devices 66 are associated with those individuals. As such, the smart-home environment "learns" who is an occupant and permits the devices 66 associated with those individuals to control the smart devices of the home.

In some instances, guests desire to control the smart devices. For example, the smart-home environment may receive communication from an unregistered mobile device of an individual inside of the home, where said individual is not recognized as an occupant of the home. Further, for example, a smart-home environment may receive communication from a mobile device of an individual who is known to be or who is registered as a guest.

According to embodiments, a guest-layer of controls can be provided to guests of the smart-home environment 30. The guest-layer of controls gives guests access to basic controls (e.g., a judicially selected subset of features of the smart devices), such as temperature adjustments, but it locks out other functionalities. The guest layer of controls can be thought of as a "safe sandbox" in which guests have limited controls, but they do not have access to more advanced controls that could fundamentally alter, undermine, damage, or otherwise impair the occupant-desired operation of the smart devices. For example, the guest layer of controls will not permit the guest to adjust the heat-pump lockout temperature.

A use case example of this is when a guest is in a smart home, the guest could walk up to the thermostat and turn the dial manually, but the guest may not want to walk around the house "hunting" the thermostat, especially at night while the home is dark and others are sleeping. Further, the guest may not want to go through the hassle of downloading the necessary application to their device for remotely controlling the thermostat. In fact, the guest may not have the home owner's login credentials, etc., and therefore cannot remotely control the thermostat via such an application. Accordingly, according to embodiments of the invention, the guest can open a mobile browser on their mobile device, type a keyword, such as "NEST" into the URL field and tap "Go" or "Search", etc. In response, the device presents the guest with a user interface which allows the guest to move the target temperature between a limited range, such as 65 and 80 degrees Fahrenheit. As discussed, the user interface provides a guest layer of controls that are limited to basic functions. The guest cannot change the target humidity, modes, or view energy history.

According to embodiments, to enable guests to access the user interface that provides the guest layer of controls, a local webserver is provided that is accessible in the local area network (LAN). It does not require a password, because physical presence inside the home is established reliably enough by the guest's presence on the LAN. In some embodiments, during installation of the smart device, such as the smart thermostat, the home owner is asked if they want to enable a Local Web App (LWA) on the smart device. Business owners will likely say no; home owners will likely say yes. When the LWA option is selected, the smart device broadcasts to the LAN that the above referenced keyword, such as "NEST", is now a host alias for its local web server. Thus, no matter whose home a guest goes to, that same keyword (e.g., "NEST") is always the URL you use to access the LWA, provided the smart device is purchased from the same manufacturer. Further, according to embodiments, if there is more than one smart device on the LAN, the second and subsequent smart devices do not offer to set up another LWA. Instead, they register themselves as target candidates with the master LWA. And in this case the LWA user would be asked which smart device they want to change the temperature on before getting the simplified user interface for the particular smart device they choose.

According to embodiments, a guest layer of controls may also be provided to users by means other than a device 66. For example, the smart device, such as the smart thermostat, may be equipped with walkup-identification technology (e.g., face recognition, RFID, ultrasonic sensors) that "fingerprints" or creates a "signature" for the occupants of the home. The walkup-identification technology can be the same as or similar to the fingerprinting and signature creating techniques described in other sections of this application. In operation, when a person who does not live in the home or is otherwise not registered with the smart home or whose fingerprint or signature is not recognized by the smart home "walks up" to a smart device, the smart device provides the guest with the guest layer of controls, rather than full controls.

As described below, the smart thermostat 46 and other smart devices "learn" by observing occupant behavior. For example, the smart thermostat learns occupants' preferred temperature set-points for mornings and evenings, and it learns when the occupants are asleep or awake, as well as when the occupants are typically away or at home, for example. According to embodiments, when a guest controls the smart devices, such as the smart thermostat, the smart devices do not "learn" from the guest. This prevents the guest's adjustments and controls from affecting the learned preferences of the occupants.

According to some embodiments, a smart television remote control is provided. The smart remote control recognizes occupants by thumbprint, visual identification, RFID, etc., and it recognizes a user as a guest or as someone belonging to a particular class having limited control and access (e.g., child). Upon recognizing the user as a guest or someone belonging to a limited class, the smart remote control only permits that user to view a subset of channels and to make limited adjustments to the settings of the television and other devices. For example, a guest cannot adjust the digital video recorder (DVR) settings, and a child is limited to viewing child-appropriate programming.

According to some embodiments, similar controls are provided for other instruments, utilities, and devices in the house. For example, sinks, bathtubs, and showers can be controlled by smart spigots that recognize users as guests or as children and therefore prevent water from exceeding a designated temperature that is considered safe.

In some embodiments, in addition to containing processing and sensing capabilities, each of the smart devices of the home (e.g., 34, 36, 46, 50, 52, 53, 54, 56, 58, and/or 66, among any other suitable smart devices that may be found in the home) (collectively referred to as "the smart devices") may be capable of data communications and information sharing with other of the smart devices, and/or to a central server or cloud-computing system or any other device that is network-connected anywhere in the world. The data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.).

According to embodiments, all or some of the smart devices can serve as wireless or wired repeaters. For example, a first one of the smart devices can communicate with a second one of the smart device via a wireless router 60. The smart devices can further communicate with each other via a connection to a network, such as the Internet 62. Through the Internet 62, the smart devices can communicate with a central server or a cloud-computing system (device service) 64. The central server or cloud-computing system (device service) 64 can be associated with a manufacturer, support entity, or service provider associated with the device. For one embodiment, a user may be able to contact customer support using a device itself rather than needing to use other communication means such as a telephone or Internet-connected computer. Further, software updates can be automatically sent from the central server or cloud-computing system (device service) 64 to devices (e.g., when available, when purchased, or at routine intervals).

According to embodiments, the smart devices combine to create a mesh network of spokesman and low-power nodes in the smart-home environment 30, where some of the smart devices are "spokesman" nodes and others are "low-powered" nodes. Some of the smart devices in the smart-home environment 30 are battery powered, while others have a regular and reliable power source, such as by connecting to wiring (e.g., to 120V line voltage wires) behind the walls 40 of the smart-home environment. The smart devices that have a regular and reliable power source are referred to as "spokesman" nodes. These nodes are equipped with the capability of using any wireless protocol or manner to facilitate bidirectional communication with any of a variety of other devices in the smart-home environment 30 as well as with the central server or cloud-computing system (device service) 64. On the other hand, the devices that are battery powered are referred to as "low-power" nodes. These nodes tend to be smaller than spokesman nodes and can only communicate using wireless protocols that require very little power, such as Zigbee, 6LoWPAN, etc. Further, some, but not all, low-power nodes are incapable of bidirectional communication. These low-power nodes send messages, but they are unable to "listen". Thus, other devices in the smart-home environment 30, such as the spokesman nodes, cannot send information to these low-power nodes.

As described, the smart devices serve as low-power and spokesman nodes to create a mesh network in the smart-home environment 30. Individual low-power nodes in the smart-home environment regularly send out messages regarding what they are sensing, and the other low-powered nodes in the smart-home environment—in addition to sending out their own messages—repeat the messages, thereby causing the messages to travel from node to node (i.e., device to device) throughout the smart-home environment 30. The spokesman nodes in the smart-home environment 30 are able to "drop down" to low-powered communication protocols to receive these messages, translate the messages to other communication protocols, and send the translated messages to other spokesman nodes and/or the central server or cloud-computing system (device service) 64. Thus, the low-powered nodes using low-power communication protocols are able send messages across the entire smart-home environment 30 as well as over the Internet 62 to the central server or cloud-computing system (device service) 64. According to embodiments, the mesh network enables the central server or cloud-computing system (device service) 64 to regularly receive data from all of the smart devices in the home, make inferences based on the data, and send commands back to one of the smart devices to accomplish some of the smart-home objectives described herein.

As described, the spokesman nodes and some of the low-powered nodes are capable of "listening". Accordingly, users, other devices, and the central server or cloud-computing system (device service) 64 can communicate controls to the low-powered nodes. For example, a user can use the portable electronic device (e.g., a smartphone) 66 to send commands over the Internet 62 to the central server or cloud-computing system (device service) 64, which then relays the commands to the spokesman nodes in the smart-home environment 30. The spokesman nodes drop down to a low-power protocol to communicate the commands to the low-power nodes throughout the smart-home environment, as well as to other spokesman nodes that did not receive the commands directly from the central server or cloud-computing system (device service) 64.

An example of a low-power node is a smart night light 65. In addition to housing a light source, the smart night light 65 houses an occupancy sensor, such as an ultrasonic or passive IR sensor, and an ambient light sensor, such as a photoresistor or a single-pixel sensor that measures light in the room. In some embodiments, the smart night light 65 is configured to activate the light source when its ambient light sensor detects that the room is dark and when its occupancy sensor detects that someone is in the room. In other embodiments, the smart night light 65 is simply configured to activate the light source when its ambient light sensor detects that the room is dark. Further, according to embodiments, the smart night light 65 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 30 as well as over the Internet 62 to the central server or cloud-computing system (device service) 64.

Other examples of low-powered nodes include battery-operated versions of the smart hazard detectors 50. These smart hazard detectors 50 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 50 can send messages that correspond to each of the respective sensors to the other devices and the central server or cloud-computing system (device service) 64, such as by using the mesh network as described above.

Examples of spokesman nodes include smart thermostats 46, smart doorbells 52, smart wall switches 54, and smart wall plugs 56. These devices 46, 52, 54, and 56 are often located near and connected to a reliable power source, and therefore can include more power-consuming components, such as one or more communication chips capable of bidirectional communication in any variety of protocols.

In some embodiments, these low-powered and spokesman nodes (e.g., devices 46, 50, 52, 54, 56, 58, and 65) can function as "tripwires" for an alarm system in the smart-home environment. For example, in the event a perpetrator circumvents detection by alarm sensors located at windows, doors, and other entry points of the smart-home environment 30, the alarm could be triggered upon receiving an occupancy, motion, heat, sound, etc. message from one or more of the low-powered and spokesman nodes in the mesh network. For example, upon receiving a message from a smart night light 65 indicating the presence of a person, the central server or cloud-computing system (device service) 64 or some other device could trigger an alarm, provided the alarm is armed at the time of detection. Thus, the alarm system could be enhanced by various low-powered and spokesman nodes located throughout the smart-home environment 30. In this example, a user could enhance the security of the smart-home environment 30 by buying and installing extra smart nightlights 65. However, in a scenario where the perpetrator uses a radio transceiver to jam the wireless network, the smart home devices 10 may be incapable of communicating with each other. Therefore, as discussed in detail below, the present techniques provide network communication jamming attack detection and notification solutions to such a problem.

In some embodiments, the mesh network can be used to automatically turn on and off lights as a person transitions from room to room. For example, the low-powered and spokesman nodes detect the person's movement through the smart-home environment and communicate corresponding messages through the mesh network. Using the messages that indicate which rooms are occupied, the central server or cloud-computing system (device service) 64 or some other device activates and deactivates the smart wall switches 54 to automatically provide light as the person moves from room to room in the smart-home environment 30. Further, users may provide pre-configuration information that indicates which smart wall plugs 56 provide power to lamps and other light sources, such as the smart night light 65. Alternatively, this mapping of light sources to wall plugs 56 can be done automatically (e.g., the smart wall plugs 56 detect when a light source is plugged into it, and it sends a corresponding message to the central server or cloud-computing system (device service) 64). Using this mapping information in combination with messages that indicate which rooms are occupied, the central server or cloud-computing system (device service) 64 or some other device activates and deactivates the smart wall plugs 56 that provide power to lamps and other light sources so as to track the person's movement and provide light as the person moves from room to room.

In some embodiments, the mesh network of low-powered and spokesman nodes can be used to provide exit lighting in the event of an emergency. In some instances, to facilitate this, users provide pre-configuration information that indicates exit routes in the smart-home environment 30. For example, for each room in the house, the user provides a map of the best exit route. It should be appreciated that instead of a user providing this information, the central server or cloud-computing system (device service) 64 or some other device could automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the smart hazard detector 50 detects smoke and activates an alarm), the central server or cloud-computing system (device service) 64 or some other device uses occupancy information obtained from the low-powered and spokesman nodes to determine which rooms are occupied and then turns on lights (e.g., nightlights 65, wall switches 54, wall plugs 56 that power lamps, etc.) along the exit routes from the occupied rooms so as to provide emergency exit lighting.

Further included and illustrated in the smart-home environment 30 of FIG. 2 are service robots 69 each configured to carry out, in an autonomous manner, any of a variety of household tasks. For some embodiments, the service robots 69 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 69 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 69 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one embodiment, the localized-thermostat service robot 69 is configured to move itself into the immediate presence (e.g., within five feet) of a particular occupant who has settled into a particular location in the home (e.g. in the dining room to eat their breakfast and read the news). The localized-thermostat service robot 69 includes a temperature sensor, a processor, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 69 proceeds to move and park itself next to the couch and keep that particular immediate space at a comfortable temperature.

Technologies by which the localized-thermostat service robot 69 (and/or the larger smart-home system of FIG. 2) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 69 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 69 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 69, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 69 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 69 can be advised by other smart-home sensors that the temperature and humidity levels are rising in the kitchen, which is nearby to the occupant's current dining room location, and responsive to this advisory the hazard detector service robot 69 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 69 having respective dedicated ones of such functionalities, by a single service robot 69 having an integration of two or more different ones of such functionalities, and/or any combinations thereof (including the ability for a single service robot 69 to have both "away" and "human facing" functionalities) without departing from the scope of the present teachings. Electrical power can be provided by virtue of rechargeable batteries or other rechargeable methods, such as an out-of-the-way docking station to which the service robots 69 will automatically dock and recharge its batteries (if needed) during periods of inactivity. Preferably, each service robot 69 includes wireless communication components that facilitate data communications with one or more of the other wirelessly communicating smart-home sensors of FIG. 2 and/or with one or more other service robots 69 (e.g., using Wi-Fi, Zigbee, Z-Wave, 6LoWPAN, etc.), and one or more of the smart-home devices 10 can be in communication with a remote server over the Internet. Alternatively or in conjunction therewith, each service robot 69 can be configured to communicate directly with a remote server by virtue of cellular telephone communications, satellite communications, 3G/4G network data communications, or other direct communication method.

Provided according to some embodiments are systems and methods relating to the integration of the service robot (s) 69 with home security sensors and related functionalities of the smart home system. The embodiments are particularly applicable and advantageous when applied for those service robots 69 that perform "away" functionalities or that otherwise are desirable to be active when the home is unoccupied (hereinafter "away-service robots"). Included in the embodiments are methods and systems for ensuring that home security systems, intrusion detection systems, and/or occupancy-sensitive environmental control systems (for example, occupancy-sensitive automated setback thermostats that enter into a lower-energy-using condition when the home is unoccupied) are not erroneously triggered by the away-service robots.

Provided according to one embodiment is a home automation and security system (e.g., as shown in FIG. 2) that is remotely monitored by a monitoring service by virtue of automated systems (e.g., cloud-based servers or other central servers, hereinafter "central server") that are in data communications with one or more network-connected elements of the home automation and security system. The away-service robots are configured to be in operative data communication with the central server, and are configured such that they remain in a non-away-service state (e.g., a dormant state at their docking station) unless permission is granted from the central server (e.g., by virtue of an "away-service-OK" message from the central server) to commence their away-service activities. An away-state determination made by the system, which can be arrived at (i) exclusively by local on-premises smart device(s) based on occupancy sensor data, (ii) exclusively by the central server based on received occupancy sensor data and/or based on received proximity-related information such as GPS coordinates from user smartphones or automobiles, or (iii) any combination of (i) and (ii) can then trigger the granting of away-service permission to the away-service robots by the central server. During the course of the away-service robot activity, during which the away-service robots may continuously detect and send their in-home location coordinates to the central server, the central server can readily filter signals from the occupancy sensing devices to distinguish between the away-service robot activity versus any unexpected intrusion activity, thereby avoiding a false intrusion alarm condition while also ensuring that the home is secure. Alternatively or in conjunction therewith, the central server may provide filtering data (such as an expected occupancy-sensing profile triggered by the away-service robots) to the occupancy sensing nodes or associated processing nodes of the smart home, such that the filtering is performed at the local level. Although somewhat less secure, it would also be within the scope of the present teachings for the central server to temporarily disable the occupancy sensing equipment for the duration of the away-service robot activity.

According to another embodiment, functionality similar to that of the central server in the above example can be performed by an on-site computing device such as a dedicated server computer, a "master" home automation console or panel, or as an adjunct function of one or more of the smart-home devices of FIG. 2. In such an embodiment, there would be no dependency on a remote service provider to provide the "away-service-OK" permission to the away-service robots and the false-alarm-avoidance filtering service or filter information for the sensed intrusion detection signals.

According to other embodiments, there are provided methods and systems for implementing away-service robot functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" setpoint temperature). According to one embodiment, the away-service robots are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some embodiments, the notification signals sent by the away-service robots to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, wherein any particular away-service robot requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s), on the other hand, as it is only required that there is the described standard one-way notification protocol or the described standard two-way request/permission protocol to be agreed upon by the respective suppliers.

According to still other embodiments, the activity sensing systems are configured to detect sounds, vibrations, RF emissions, or other detectable environmental signals or "signatures" that are intrinsically associated with the away-service activity of each away-service robot, and are further configured such that no disturbance-detected outcome will occur for as long as that particular detectable signal or environmental "signature" is detected. By way of example, a particular kind of vacuum-cleaning away-service robot may emit a specific sound or RF signature. For one embodiment, the away-service environmental signatures for each of a number of known away-service robots are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots for that home during that training session, and thereafter will suppress disturbance-detected outcomes for intervals in which those environmental signatures are heard.

For still another embodiment, which is particularly useful when the activity sensing system is associated with occupancy-sensitive environmental control equipment rather than a home security system, the activity sensing system is configured to automatically learn the environmental signatures for the away-service robots by virtue of automatically performing correlations over time between detected environmental signatures and detected occupancy activity. By way of example, for one embodiment an intelligent automated nonoccupancy-triggered setback thermostat such as the Nest Learning Thermostat can be configured to constantly monitor for audible and RF activity as well as to perform infrared-based occupancy detection. In particular view of the fact that the environmental signature of the away-service robot will remain relatively constant from event to event, and in view of the fact that the away-service events will likely either (a) themselves be triggered by some sort of nonoccupancy condition as measured by the away-service robots themselves, or (b) occur at regular times of day, there will be patterns in the collected data by which the events themselves will become apparent and for which the environmental signatures can be readily learned. Generally speaking, for this automatic-learning embodiment in which the environmental signatures of the away-service robots are automatically learned without requiring user interaction, it is more preferable that a certain number of false triggers be tolerable over the course of the learning process. Accordingly, this automatic-learning embodiment is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious consequences, whereas false home security alarms may have more serious consequences.

According to embodiments, technologies including the sensors of the smart devices located in the mesh network of the smart-home environment in combination with rules-based inference engines or artificial intelligence provided at the central server or cloud-computing system (device service) 64 are used to provide a personal "smart alarm clock" for individual occupants of the home. For example, user-occupants can communicate with the central server or cloud-computing system (device service) 64 via their mobile devices 66 to access an interface for the smart alarm clock. There, occupants can turn on their "smart alarm clock" and input a wake time for the next day and/or for additional days. In some embodiments, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time.

According to embodiments, the smart device in the smart-home environment 30 that happens to be closest to the occupant when the occupant falls asleep will be the device that transmits messages regarding when the occupant stopped moving, from which the central server or cloud-computing system (device service) 64 will make inferences about where and when the occupant prefers to sleep. This closest smart device will as be the device that sounds the alarm to wake the occupant. In this manner, the "smart alarm clock" will follow the occupant throughout the house, by tracking the individual occupants based on their "unique signature", which is determined based on data obtained from sensors located in the smart devices. For example, the sensors include ultrasonic sensors, passive IR sensors, and the like. The unique signature is based on a combination of walking gate, patterns of movement, voice, height, size, etc. It should be appreciated that facial recognition may also be used.

According to an embodiment, the wake times associated with the "smart alarm clock" are used by the smart thermostat 46 to control the HVAC in an efficient manner so as to pre-heat or cool the house to the occupant's desired "sleeping" and "awake" temperature settings. The preferred settings can be learned over time, such as by observing which temperature the occupant sets the thermostat to before going to sleep and which temperature the occupant sets the thermostat to upon waking up.

According to an embodiment, a device is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 46 so as to pre-heat or cool the home to the occupant's desired setting before the occupant wakes up. Further, these predictions can be used to set the "smart alarm clock" for the occupant, to turn on lights, etc.

According to embodiments, technologies including the sensors of the smart devices located throughout the smart-home environment in combination with rules-based inference engines or artificial intelligence provided at the central server or cloud-computing system (device service) 64 are used to detect or monitor the progress of Alzheimer's Disease. For example, the unique signatures of the occupants are used to track the individual occupants' movement throughout the smart-home environment 30. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to embodiments, the remote servers or cloud computing architectures 64 analyze the person's migration data collected by the mesh network of the smart-home environment to identify such patterns.

Figure 3:
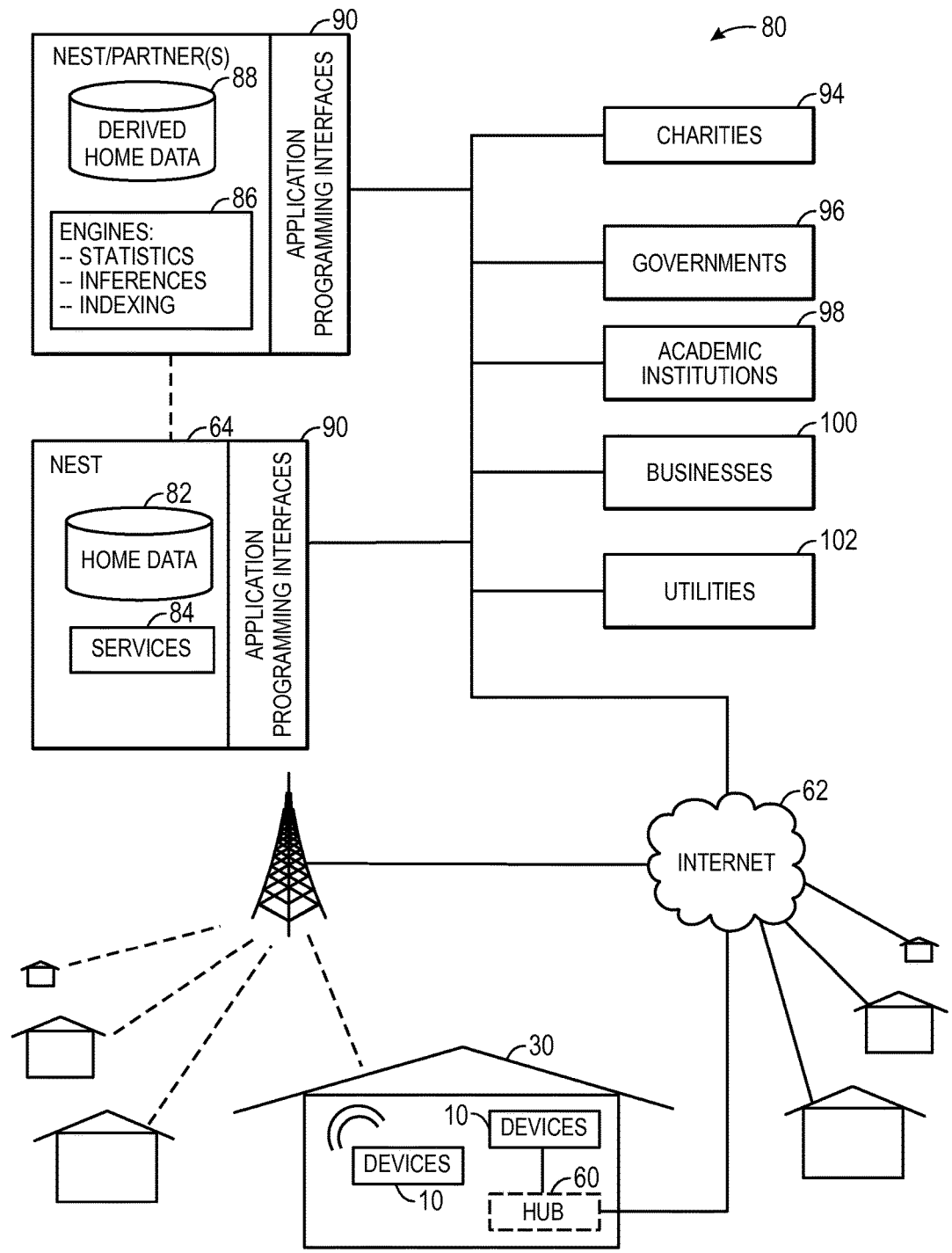
FIG. 3 is a block diagram illustrating a manner of controlling and/or accessing the smart home environment using services over the internet, in accordance with an embodiment.

In addition, FIG. 3 illustrates an embodiment of an extensible devices and services platform 80 that can be concentrated at a single server or distributed among several different computing entities without limitation with respect to the smart-home environment 30. The extensible devices and services platform 80 may include a processing engine 86, which may include engines that receive data from devices of smart-home environments (e.g., via the Internet or a hubbed network), to index the data, to analyze the data and/or to generate statistics based on the analysis or as part of the analysis. The analyzed data can be stored as derived home data 88.

Results of the analysis or statistics can thereafter be transmitted back to the device that provided home data used to derive the results, to other devices, to a server providing a web page to a user of the device, or to other non-device entities. For example, use statistics, use statistics relative to use of other devices, use patterns, and/or statistics summarizing sensor readings can be generated by the processing engine 86 and transmitted. The results or statistics can be provided via the Internet 62. In this manner, the processing engine 86 can be configured and programmed to derive a variety of useful information from the home data 82. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 86 can generate statistics about device usage across a population of devices and send the statistics to device users, service providers or other entities (e.g., that have requested or may have provided monetary compensation for the statistics).

According to some embodiments, the home data 82, the derived home data 88, and/or another data can be used to create "automated neighborhood safety networks." For example, in the event the central server or cloud-computing architecture 64 receives data indicating that a particular home has been broken into, is experiencing a fire, or some other type of emergency event, an alarm is sent to other smart homes in the "neighborhood." In some instances, the central server or cloud-computing architecture 64 automatically identifies smart homes within a radius of the home experiencing the emergency and sends an alarm to the identified homes. In such instances, the other homes in the "neighborhood" do not have to sign up for or register to be a part of a safety network, but instead are notified of an emergency based on their proximity to the location of the emergency. This creates robust and evolving neighborhood security watch networks, such that if one person's home is getting broken into, an alarm can be sent to nearby homes, such as by audio announcements via the smart devices located in those homes. It should be appreciated that this can be an opt-in service and that, in addition to or instead of the central server or cloud-computing architecture 64 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some embodiments, sound, vibration, and/or motion sensing components of the smart devices are used to detect sound, vibration, and/or motion created by running water. Based on the detected sound, vibration, and/or motion, the central server or cloud-computing architecture 64 makes inferences about water usage in the home and provides related services. For example, the central server or cloud-computing architecture 64 can run programs/algorithms that recognize what water sounds like and when it is running in the home. According to one embodiment, to map the various water sources of the home, upon detecting running water, the central server or cloud-computing architecture 64 sends a message an occupant's mobile device asking if water is currently running or if water has been recently run in the home and, if so, which room and which water-consumption appliance (e.g., sink, shower, toilet, etc.) was the source of the water. This enables the central server or cloud-computing architecture 64 to determine the "signature" or "fingerprint" of each water source in the home. This is sometimes referred to herein as "audio fingerprinting water usage."

In one illustrative example, the central server or cloud-computing architecture 64 creates a signature for the toilet in the master bathroom, and whenever that toilet is flushed, the central server or cloud-computing architecture 64 will know that the water usage at that time is associated with that toilet. Thus, the central server or cloud-computing architecture 64 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices are used to detect sound, vibration, and/or motion created by mice and other rodents as well as by termites, cockroaches, and other insects (collectively referred to as "pests"). Based on the detected sound, vibration, and/or motion, the central server or cloud-computing architecture 64 makes inferences about pest-detection in the home and provides related services. For example, the central server or cloud-computing architecture 64 can run programs/algorithms that recognize what certain pests sound like, how they move, and/or the vibration they create, individually and/or collectively. According to one embodiment, the central server or cloud-computing architecture 64 can determine the "signatures" of particular types of pests.

For example, in the event the central server or cloud-computing architecture 64 detects sounds that may be associated with pests, it notifies the occupants of such sounds and suggests hiring a pest control company. If it is confirmed that pests are indeed present, the occupants input to the central server or cloud-computing architecture 64 confirms that its detection was correct, along with details regarding the identified pests, such as name, type, description, location, quantity, etc. This enables the central server or cloud-computing architecture 64 to "tune" itself for better detection and create "signatures" or "fingerprints" for specific types of pests. For example, the central server or cloud-computing architecture 64 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing architecture 64 can make inferences that nearby homes may also have such problems or may be susceptible to having such problems, and it can send warning messages to those homes to help facilitate early detection and prevention.

In some embodiments, to encourage innovation and research and to increase products and services available to users, the devices and services platform 80 expose a range of application programming interfaces (APIs) 90 to third parties, such as charities 94, governmental entities 96 (e.g., the Food and Drug Administration or the Environmental Protection Agency), academic institutions 98 (e.g., university researchers), businesses 100 (e.g., providing device warranties or service to related equipment, targeting advertisements based on home data), utility companies 102, and other third parties. The APIs 90 are coupled to and permit third-party systems to communicate with the central server or the cloud-computing system (device service) 64, including the services 84, the processing engine 86, the home data 82, and the derived home data 88. For example, the APIs 90 allow applications executed by the third parties to initiate specific data processing tasks that are executed by the central server or the cloud-computing system (device service) 64, as well as to receive dynamic updates to the home data 82 and the derived home data 88.

For example, third parties can develop programs and/or applications, such as web or mobile apps, that integrate with the central server or the cloud-computing system (device service) 64 to provide services and information to users. Such programs and application may be, for example, designed to help users reduce energy consumption, to pre-emptively service faulty equipment, to prepare for high service demands, to track past service performance, etc., or to perform any of a variety of beneficial functions or tasks now known or hereinafter developed. To ensure the continued proper functioning of the smart home devices 10 that these programs and/or applications interact with, device-state-based message limiting may be employed based on various operation status parameters (e.g., a current battery level, charging rate, device age, planned device lifespan, recent wireless usage, internal temperature, and/or the operation status parameters of other connected devices 10 that are being used to access the target smart home device 10).

According to some embodiments, third-party applications make inferences from the home data 82 and the derived home data 88, such inferences may include when occupants are home, when they are sleeping, when they are cooking, when they are in the den watching television, and when they are showering. The answers to these questions may help third-parties benefit consumers by providing them with interesting information, products and services as well as with providing them with targeted advertisements.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company.

In another example, a car company may develop a car navigation application that can determine an estimated time of arrival (ETA) to a home. The application may continually update a device service through the APIs associated with the To further illustrate, FIG. 4 describes an abstracted functional view 110 of the extensible devices and services platform 80 of FIG. 3, with particular reference to the processing engine 86 as well as devices, such as those of the smart-home environment 30 of FIG. 2. Even though devices situated in smart-home environments will have an endless variety of different individual capabilities and limitations, they can all be thought of as sharing common characteristics in that each of them is a data consumer 112 (DC), a data source 114 (DS), a services consumer 116 (SC), and a services source 118 (SS). Advantageously, in addition to providing the essential control information needed for the devices to achieve their local and immediate objectives, the extensible devices and services platform 80 can also be configured to harness the large amount of data that is flowing out of these devices. In addition to enhancing or optimizing the actual operation of the devices themselves with respect to their immediate functions, the extensible devices and services platform 80 can be directed to "repurposing" that data in a variety of automated, extensible, flexible, and/or scalable ways to achieve a variety of useful objectives.

These objectives may be predefined or adaptively identified based on, e.g., usage patterns, device efficiency, and/or user input (e.g., requesting specific functionality).

Figure 4:
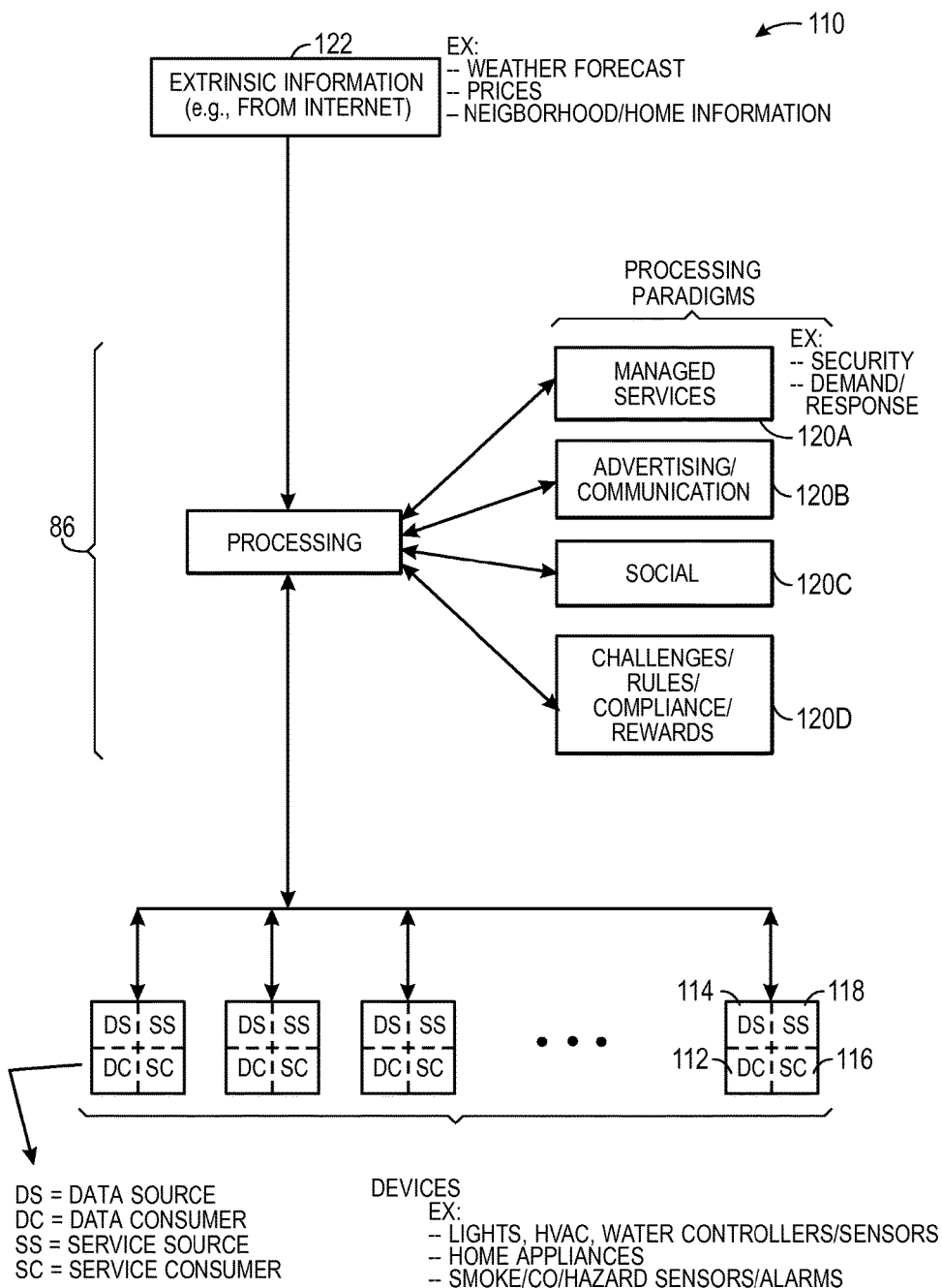
FIG. 4 is a block diagram of processing paradigms that may be used to control devices of the smart home environment, in accordance with an embodiment.

For example, FIG. 4 shows processing engine 86 as including a number of paradigms 120. Processing engine 86 can include a managed services paradigm 120a that monitors and manages primary or secondary device functions. The device functions can include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 86 can further include an advertising/communication paradigm 120b that estimates characteristics (e.g., demographic information), desires and/or products of interest of a user based on device usage. Services, promotions, products or upgrades can then be offered or automatically provided to the user. Processing engine 86 can further include a social paradigm 120c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings that result in low power bills and other users may download the HVAC settings to their smart thermostat 46 to reduce their power bills.

The processing engine 86 can include a challenges/rules/compliance/rewards paradigm 120d that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those that successfully complete the challenge are rewarded, such as by coupons, virtual currency, status, etc. Regarding compliance, an example involves a rental-property owner making a rule that no renters are permitted to access certain owner's rooms. The devices in the room having occupancy sensors could send updates to the owner when the room is accessed.

The processing engine 86 can integrate or otherwise utilize extrinsic information 122 from extrinsic sources to improve the functioning of one or more processing paradigms. Extrinsic information 122 can be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform 80, ranging from the ordinary to the profound. Thus, in one "ordinary" example, each bedroom of the smart-home environment 30 can be provided with a smart wall switch 54, a smart wall plug 56, and/or smart hazard detectors 50, all or some of which include an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform 80, there can be substantially more "profound" examples that can truly illustrate the potential of a larger "intelligence" that can be made available. By way of perhaps a more "profound" example, the same bedroom occupancy data that is being used for fire safety can also be "repurposed" by the processing engine 86 in the context of a social paradigm of neighborhood child development and education. Thus, for example, the same bedroom occupancy and motion data discussed in the "ordinary" example can be collected and made available (properly anonymized) for processing in which the sleep patterns of schoolchildren in a particular ZIP code can be identified and tracked. Localized variations in the sleeping patterns of the schoolchildren may be identified and correlated, for example, to different nutrition programs in local schools.

Device-State-Based Message Limiting

Although third-party programs, applications, and/or application services may be used to communicate requests or commands to the smart home devices 10, in some embodiments these may not be sent directly to the smart home devices 10. Indeed, doing so in an unrestricted fashion could reduce the desired functionally of the smart home devices 10 in some circumstances. For example, the battery may drain too quickly and/or the internal temperature of the electronic device may become so high that certain functionalities of the smart home device 10 may become inhibited (e.g., if a thermostat has too high an internal temperature, it may have difficulties determining the temperature of its environment). As such, as shown by a message limiting system 140 of FIG. 5, the smart home devices 10 may be accessed via a cloud service in a rule-based, rate-limited and/or device-state-based manner to preserve their proper functionality. Moreover, although the smart home devices 10 have been used by way of example, any other suitable type of electronic devices may be communicated with and/or controlled in the manner of this disclosure.

Figure 5:
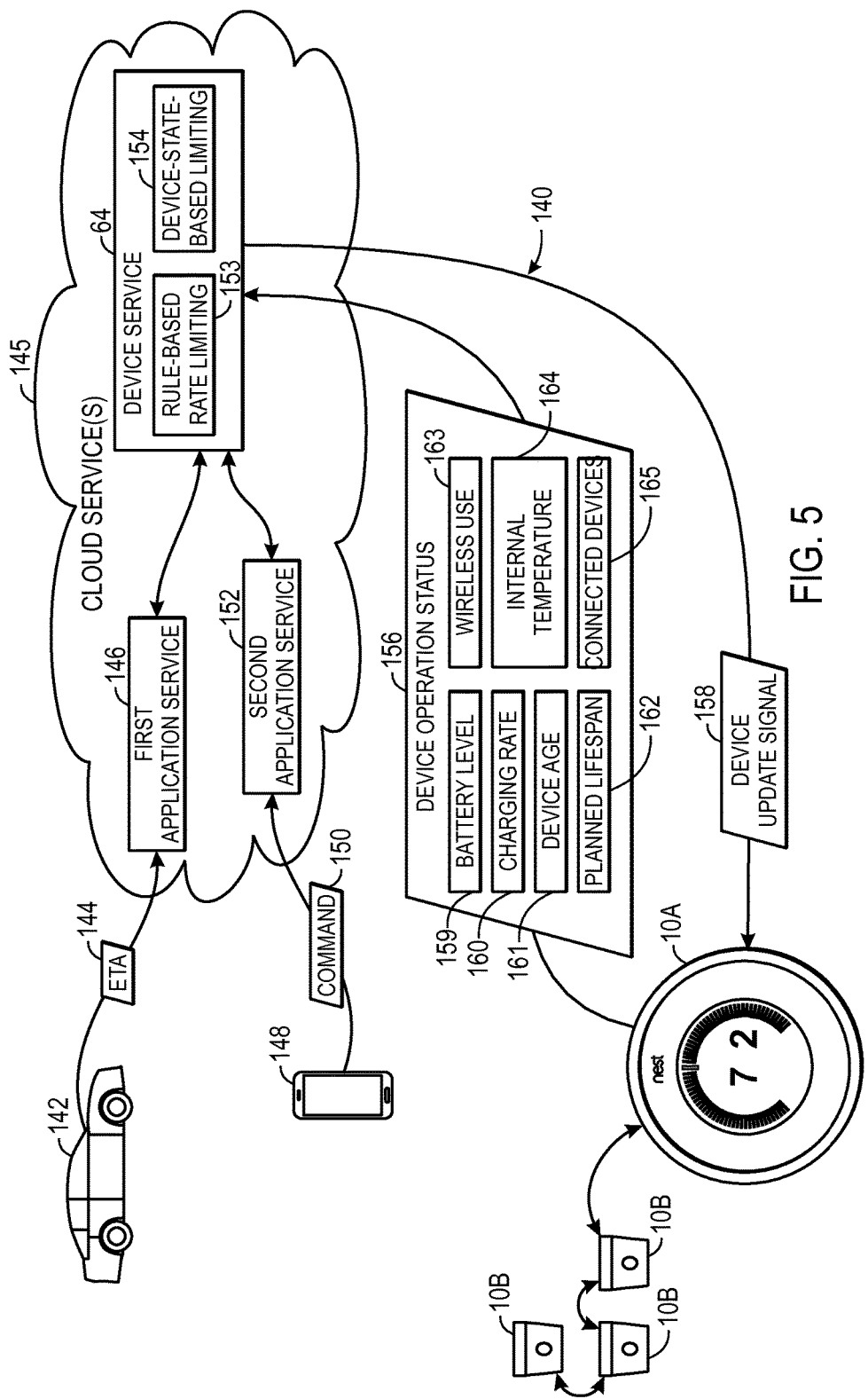
FIG. 5 is a block diagram of a system that uses device-state-based message limiting and/or rule-based rate limiting to provide third-party access to smart home devices without negatively impacting the user experience with the smart home devices, in accordance with an embodiment.

As illustrated in FIG. 5, a person may desire to access a number of smart home devices 10, such as a first smart home device 10A and second smart home devices 10B. In the example of FIG. 5, the first smart home device 10A is an example of a smart thermostat, such as the Nest® Learning Thermostat by Nest Labs, Inc. (a company of Google, Inc.), and the second smart home devices 10B are examples of smart hazard detectors, such as the Nest® Protect by Nest Labs, Inc. Two application programs are shown accessing the smart home devices 10A and/or 10B through the device service 64. Although FIG. 5 illustrates accessing the smart home devices 10A and/or 10B using two separate application programs, it should be appreciated that any suitable number of application programs may be used to access the smart home devices 10A and/or 10B. Moreover, it should be appreciated that the example of FIG. 5 is not intended to list every component that may be present in such a system to provide third-party access to target electronic devices such as the smart home devices 10.

In the example of FIG. 5, a first application 142 sends a first device request message 144 targeted to a smart home device 10 (e.g., the smart home device 10A) into cloud service(s) 145 and, more specifically, to a first application service 146. A second application 148 may be used to issue a second device request message 150 targeted to a smart home device 10 (e.g., the smart home device 10A) to a second application service 152 also among the cloud service (s) 145. In the example shown, the first application 142 is a navigation application that sends estimated-time-of-arrival (ETA) information in the device request messages 144. By sending a number of ETA messages as the device request messages 144, the first application 142 may be used to cause the smart home devices 10A and/or 10B to be prepared when a person arrives home. Thus, as an example, the first application 142 may send occasional device request messages 144 indicating the ETA to the first application service 146, which may forward this information to the device service 64 (e.g., via an API, as discussed above). The device service 64 may hold the device request messages 144 from the first application 142 until an appropriate time. In the illustrated example, the second application 148 may be a third-party home-automation application that may be running on a portable electronic device, such as a personal mobile device. The second application 148 may generate device request messages 150, such as commands to control or request information from the smart home devices 10A and/or 10B. The second application service 152 may interface with the device service 64 by way of an API, as mentioned above.

Although the first application service 146, the second application service 152, and the device service 64 are illustrated in FIG. 5 as cloud service(s) 145, it may appreciated that some or all of these services may run on electronic devices that are not remote cloud-computer systems accessible by way of the Internet. Indeed, in some examples, the device service 64 may not be on a network that is remote from the smart home devices 10A and/or 10B, but rather may be running on an electronic device in the same local area network as the smart home devices 10A and/or 10B. For example, the device service 64 may, additionally or alternatively, run on a local server computer and/or a local wireless router on the same local area network as the smart home devices 10A and/or 10B. Moreover, some applications may communicate directly with the device service 64 (e.g., via the API) rather than communicating through an application service such as the first application service 146 or the second application service 152.

Regardless of the number of applications that may issue device request messages (e.g., 144 or 150) to the device service 64, the device service 64 may not merely forward these messages to the smart home devices 10A and/or 10B that the device request messages are targeted too. Rather, the device service 64 may serve as the point of contact that third-party application programs may use to access the smart home devices 10A and/or 10B. The device service 64 then may communicate information and/or commands provided by the applications to the smart home devices 10A and/or 10B in a limited manner. This may reduce the risk that operation of the devices 10A and/or 10B is negatively impacted as a result of access to those devices being provided to third party applications/devices. Moreover, as will be discussed further below, the device service 64 may include a rule-based rate-limiting component 153 to prevent messages having certain parameters (e.g., deriving from a particular instance of an application and/or from a particular user) from overwhelming the device service 64 and/or the smart home electronic devices 10. The device service 64 may also include a device-state-based message limiting component 154, which may cause request messages to be provided to target electronic devices 10 in a way that does not substantially negatively impact the operation of the target electronic devices 10.

In some embodiments, to assist the device service 64 in making message-limiting decisions, the smart home devices 10A and/or 10B may occasionally transmit device operation status parameters 156 to the device service 64. The device service 64 may use the device operation status parameters 156 to determine when a message may be acceptably provided to a target electronic device 10 that would reduce the risk of the operation of the smart home devices 10A and/or 10B being negatively impacted as a result of the first and second applications accessing those devices. In one example to be discussed further below, the device service 64 may determine whether or not to provide a device update signal 158 based at least partly on the device operation status parameters 156. For example, the device service 64 may limit communication sessions with the smart home devices 10A and/or 10B to prevent a battery level of the smart home devices 10A and/or 10B from dropping so low that the smart home device 10A and/or 10B is more likely to malfunction. It should be appreciated that while the device update signal 158 may be a communication in which the first and/or second application request updates to a status or operation of the smart home devices 10A and/or 10B, embodiments are not so limited. That is, message limiting may be applied to all communications desired to be sent to the smart home devices by the cloud services on behalf of the first and/or second application services, and may include requests for information (e.g., requests for a status of the smart home devices) or other types of communication.

The device operation status parameters 156 may correspond only to a target smart home device 10 (e.g., the smart home device 10A), or may correspond to other smart home devices 10 that are in the vicinity of the target smart home device 10 (e.g., the smart home device 10A and the smart home devices 10B). In one example, when the target smart home device 10 for the device request messages 144 and/or 150 are the smart home device 10A, the device operation status parameters 156 may correspond substantially only to the smart home device 10A. In another example, when the target smart home device 10 is one of the smart home devices 10B, which is accessible by way of the smart home device 10A, the device operation status parameters 156 may contain operational parameter information about both the smart home device 10A and the smart home device 10B.

Before continuing, an alternative embodiment will be briefly discussed. Specifically, the smart home devices 10A and/or 10B may not provide the device operation status parameters 156 to the device service 64 for the purposes of assisting the device service 64 in performing the message limiting logic discussed herein. Instead, the smart home devices 10A and/or 10B may themselves determine (and use) an appropriate amount of message limiting using the device operation status parameters 156. Doing so may not necessarily reduce the amount of communication that takes place between the smart home devices 10A and/or 10B and the device service 64, but may still achieve reductions in processing by and thus power consumption by the smart home devices 10A and/or 10B. Such self-management of incoming communications from third party applications/devices may be implemented in one or more of a number of fashions. For example, in one embodiment, the smart home device 10A may include both high and lower power wireless transceivers, as well as one or more processors. The device may typically operate in a low power mode where, e.g., the processor(s) are effectively inoperative, the high power transceiver is inoperative, and the low power transceiver is in a listening mode. The message-limiting logic may be incorporated into the low power transceiver and/or a low power processor associated with the low power transceiver. When a communication from a third party application/device is received, the low power transceiver and/or low power processor may apply the message-limiting logic to those incoming communications and decide whether to consume those communications (e.g., wake-up a high power processor to process and/or respond to those communications) based on that message limiting logic. It should be appreciated that although the smart home devices 10A and/or 10B may determine how to control consumption of communications, in some embodiments the smart home devices 10A and/or 10B may determine when to limit communication and provide an indication of such to the device service 64 (with or without the device operation status parameters 156) to allow the device service 64 to manage when to provide update signals to the devices 10.

In any case, the device operation status parameters 156 may represent any suitable characteristics of the operation status of the smart home devices 10A and/or 10B that may affect the proper functioning of the smart home devices 10A and/or 10B. Thus, the device operation status parameters 156 may include, for example: a battery level 159 indicative of an amount of charge remaining in a battery of the smart home device; a charging rate 160 indicative of a current rate that the battery of the smart home device is charging; a current device age 161 indicative of a period of use since initial install, a period of use since manufacture, a period of use since original sale, etc.; a planned lifespan 162 indicative of an expected useful operational duration of the smart home device; an amount of recent wireless use 163 (selected within a timespan recent enough to substantially affect an internal temperature of the smart home device 10); a direct measurement of an internal device temperature 164; and/or device operation status parameters for connected devices 165. The operational status parameters for connected devices 165 may represent any suitable operational parameters that may describe the smart home devices 10 (e.g., smart home device 10A) through which the device service 64 may use to connect to a target smart home device 10 (e.g., one of the smart home devices 10B). For example, regarding the operational status parameters for connected devices 165, if the target smart home device 10 is the last smart home device 10B through three smart home devices 10 in three communication "hops", the device operation status parameters 156 associated with these three intervening smart home devices 10 may be included. This may allow the device service 64 to limit communication to the final node in a mesh network of smart home devices 10 to preserve the desired operation of all of the intervening smart home devices 10.

Each of the device operation status parameters 156 discussed above will be discussed further below. Moreover, it should be appreciated that the various specific device operation status parameters 156 shown in FIG. 5 are provided by way of example. As such, the device operation status parameters 156 shown in FIG. 5 should not be understood to be exhaustive, but merely representative of possible operational parameters that may be considered for effective message limiting. For example, additional device operation status parameters may include a current operation of the device (e.g., sleeping, awake, Wifi active/inactive, executing a demand-response algorithm, executing a time-to-temperature algorithm, etc.).

Figure 6:
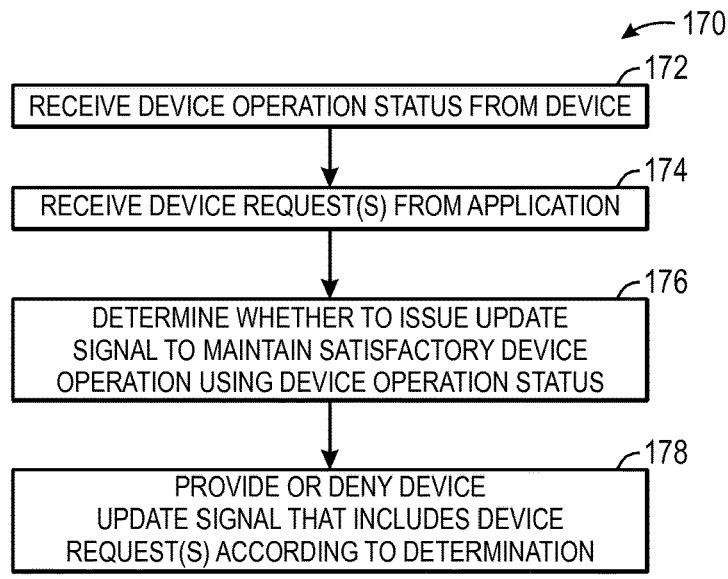
FIG. 6 is a flowchart of a method for performing device-state-based message limiting using the system of FIG. 5, in accordance with an embodiment.

The device service 64 may perform device-state-based message limiting using the device operation status parameters 156 in any suitable manner. In one example, shown by a flowchart 170 of FIG. 6, the device service 64 may receive one or more of the device operation status parameters 156 from a target smart home device 10 (e.g., the smart home device 10A) (block 172). The device service 64 may receive the device operation status parameters 156 occasionally from the target smart home device 10 (e.g., periodically or at a different time when the smart home device 10A is an "awake" state). Additionally or alternatively, the device service 64 may occasionally poll the smart home device(s) to request device operation status parameters 156 on occasion (e.g., periodically) or in response to receiving a device request message (e.g., 144 or 150).

The device service 64 may receive a device request message (e.g., the 144 or 150) (block 174), and may determine whether to communicate an update signal from the device service 64 to the target smart device 10A (block 176) on behalf of a third party application/device. Because, in some embodiments, the device service 64 determines whether to provide the update signal not merely based on the particular type of smart home device 10, but rather on the specific device operation status parameters 156 associated with the smart home device 10, different installations of the same type of smart home devices 10 may receive update signals from the device service 64 at different times. In this way, a relatively higher number of update signals may be provided for devices with certain device operation status parameters 156 (e.g., a relatively high battery level and/or a relatively high charging rate), while a relatively lower number of update signals may be provided for devices with other device operation status parameters 156 (e.g., a relatively low battery level and/or a relatively low charging rate). Thus, the device service 64 may provide or not provide a corresponding device update signal 158 that includes or incorporates the information of the device request message (e.g., 144 or 150).

Figure 7:
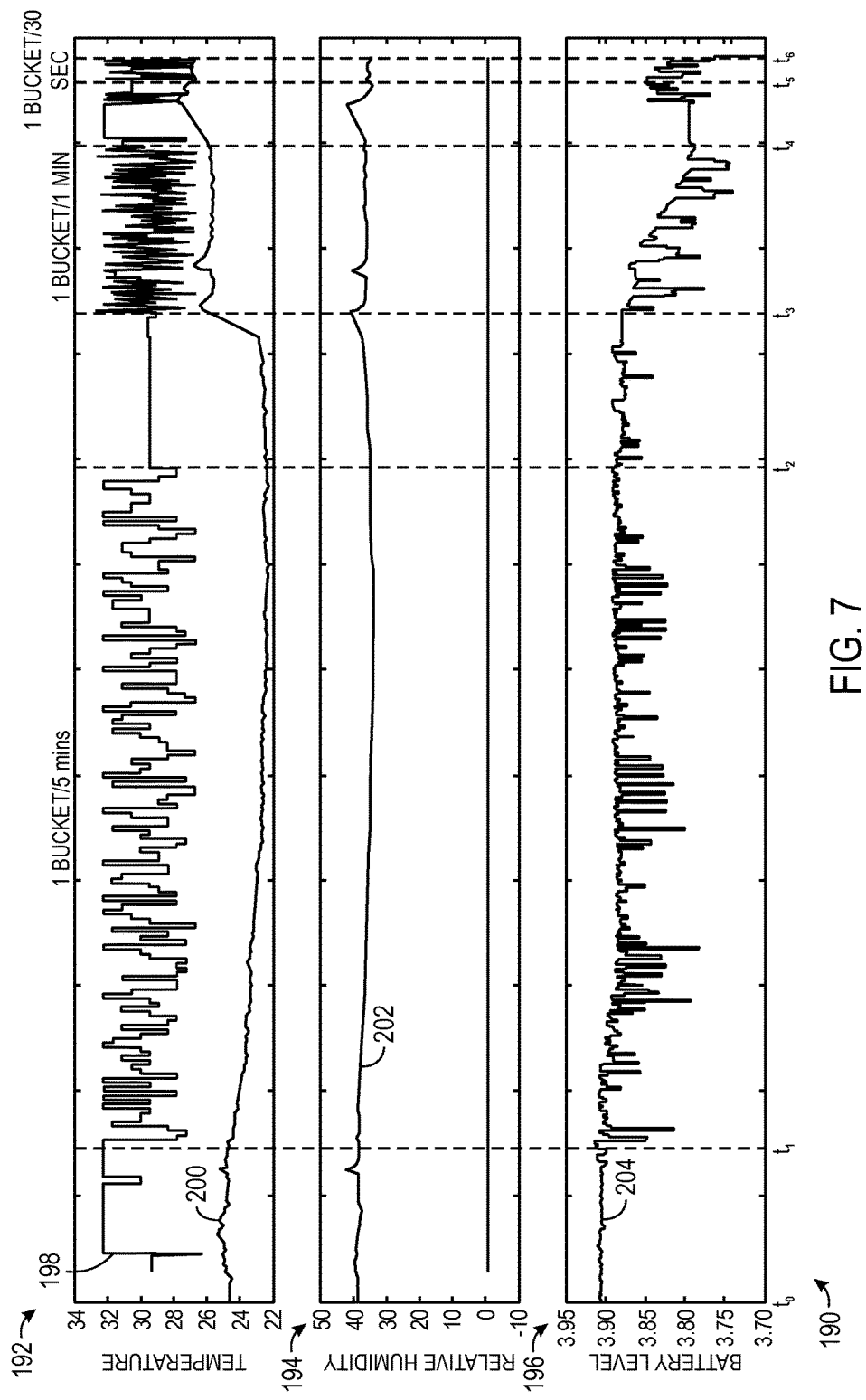
FIG. 7 is a plot of battery level in relation to various access rates, in accordance with an embodiment.

Indeed, the device operation status parameters 156 may indicate whether a providing an update signal could cause the target smart home device 10 (e.g., the smart home device 10A) to behave in a manner unsatisfactory for its desired user experience. As seen in FIG. 7, a plot 190 shows a sensed temperature of the device (plot 192), sensed relative humidity (plot 194), and device battery level (plot 196) over time. In the plot 192, data communication is plotted as a curve 198. In particular, the curve 198 represents temperature setpoints programmed to the smart home device 10A. Thus, the rate of update signals sent to the smart home device 10 may be evident by seeing how the temperature setpoints of the curve 198 are changing. From a time t1 to t2, communication is provided to the target smart home device at a rate of 1 "bucket" (i.e., fixed amount of data) per 5 minutes (indicated in the curve 198 as a different temperature setpoint approximately every 5 minutes). During this time, the temperature of a test chamber where the device 10 is being tested remains the same, and the sensed temperature illustrated by the temperature curve 200 and a sensed relative humidity curve 202 remain stable. Also during this time, a battery curve 204 shows that the battery level of the target smart home device 10 may become immediately but temporarily lower, as the low frequency of informational messages being communicated to the device is low enough to allow the battery to recharge between communications.

Between times t2 and t3, no communication takes place, the battery level is maintained to be approximately constant, and humidity and temperature are also approximately constant until the point in time nearing t3. Here, the sensed temperature of the curve 198 increases because the temperature of the test chamber has been increased. Under a higher temperature, the device 10 may be more likely to incorrectly sense temperature. Between t3 and t4, the rate of communication is increased to 1 "bucket" per minute. This causes the device 10 to less accurately sense the temperature (curve 198) or relative humidity (curve 202). Both curves 198 and 202 vary, even though the actual temperature and humidity of the test chamber remained constant. This may imply that the internal temperature of the smart home device 10, varying due to increased levels of communication. The increased rate of communication, then, is believed to change the ability of certain sensors 12 in the target smart home device 10 to behave as desired. Moreover, the battery level is shown to decrease precipitously between times t3 and t4 when the rate of communication is increased to 1 "bucket" per minute. Indeed, increasing the communication to 1 "bucket" per 30 seconds between times t5 and t6 may cause the target smart home device 10 to behave even more unsatisfactorily. Specifically, between times t5 and t6, the battery level is shown to drop so low that the target smart home device 10 becomes substantially unusable (e.g., Wifi communication may become inoperable, a high-powered processor may become inoperable, etc.) until the battery level is recharged.

Figure 8:
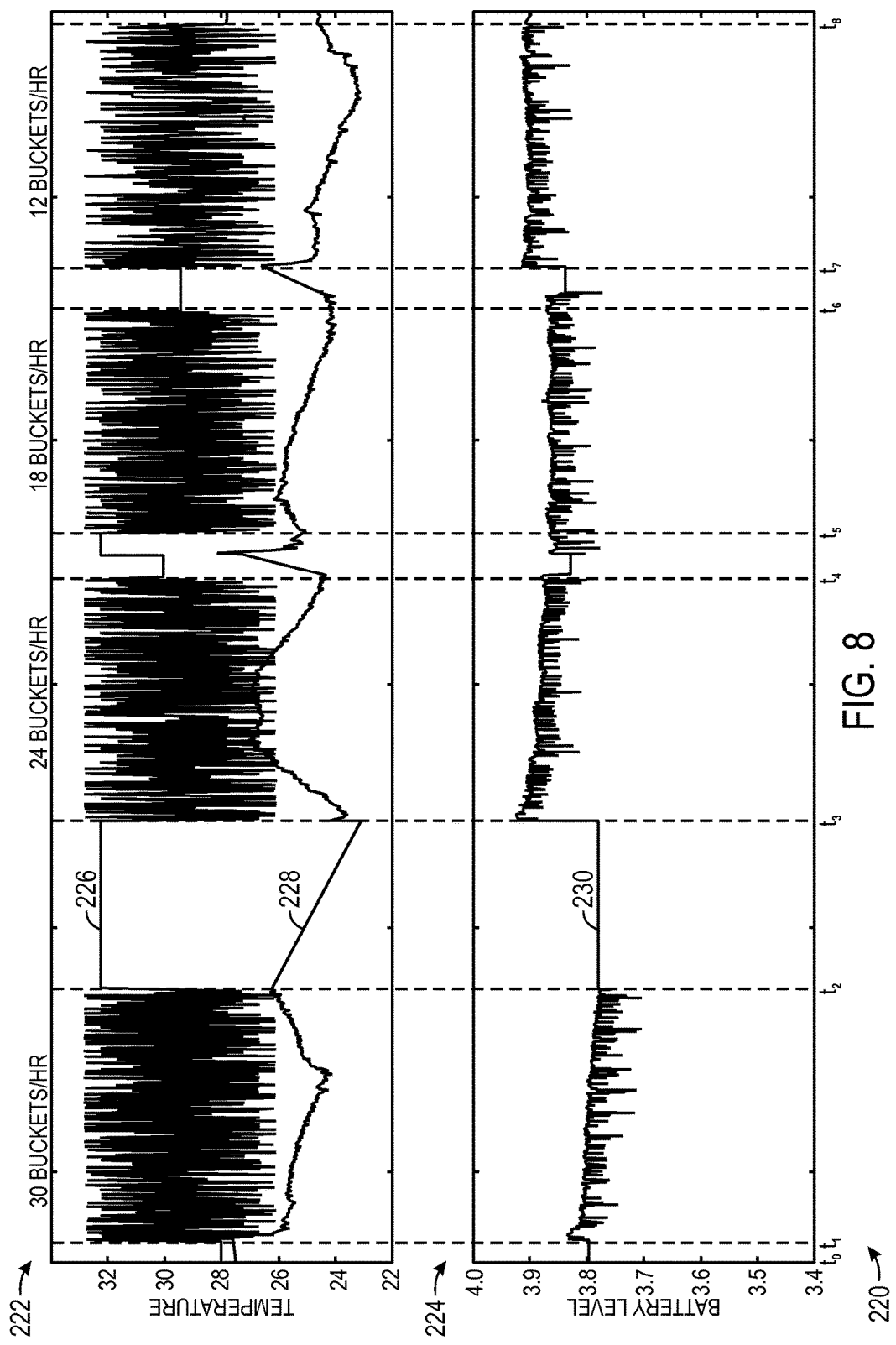
FIG. 8 is a plot of internal temperature in relation to various access rates, in accordance with an embodiment.

Another group of plots 220 of FIG. 8 compare sensed temperature (plot 222) and battery level (plot 224) for a lower-power smart home device 10 that includes a slower recharging rate than that described in FIG. 7. As seen in FIG. 8, from times t1 to t2, a communication rate shown by a curve 226 is limited to 30 "buckets" per hour. During this time period, a sensed temperature shown by a curve 228 varies, and a battery level shown by a curve 230 also drops, but relatively slowly. Moreover, after a period of no communication between times t2 and t3, the battery level rises sufficiently. Indeed, the battery level remains relatively steady from times t3 to times t8 as the rate of communication is decreased. Specifically, as shown in FIG. 8, the communication rate is 24 "buckets" (sessions) per hour from times t3 to t4, 18 "buckets" (sessions) per hour from times t5 to t6, and 12 "buckets" (sessions) per hour from times t7 to t8. All of these relatively lower communication rates allow the smart home device 10 enough time to recover after changes in temperature and/or battery level. In other words, these communication rates, for the particular smart home device modeled by the group of plots 220, are sustainably low enough to maintain the proper functioning of the smart home device 10.

Figure 9:
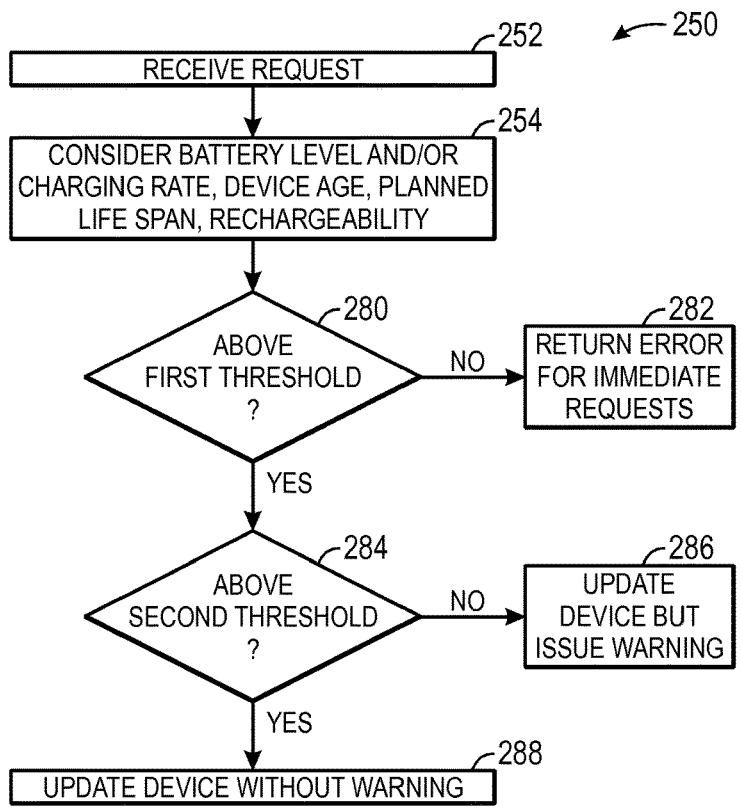
FIG. 9 is a flowchart of a method for performing device-state-based message limiting using battery level and/or charging rate, age, planned lifespan, and/or recharge ability, in accordance with an embodiment.

From the plots shown in FIGS. 7 and 8, it may be appreciated that among the various device operation status parameters 156, the battery level 159 may be one of those substantially affected by the communication rate with the target smart home device 10. As such, as shown by a flowchart 250 of FIG. 9, the battery level 159 and/or charging rate 160, device age 161, and/or planned lifespan 162, as well as whether the battery of the smart home device 10 is or is not rechargeable, may be used to determine whether or not to provide a communication signal to an electronic device on behalf of a third party application/device. In the example of FIG. 9, the device service 64 may receive a device request message (e.g., 144 or 150) (block 252). The device service 64 may consider at least a battery level 159 of the smart home device 10 (block 254). The device service 64 may or may not consider the charging rate 160, the device age 161, and/or the device planned lifespan 162 as well. Indeed, the charging rate 160, the device age 161, and/or the device planned lifespan 162 may be used to determine what threshold(s) the battery level 159 should be compared to determine whether or not to provide an update signal 158. That is, the device service 64 may determine whether to send an update signal depending on how quickly the battery level 159 is likely to charge or discharge over its lifespan.

Figure 10:
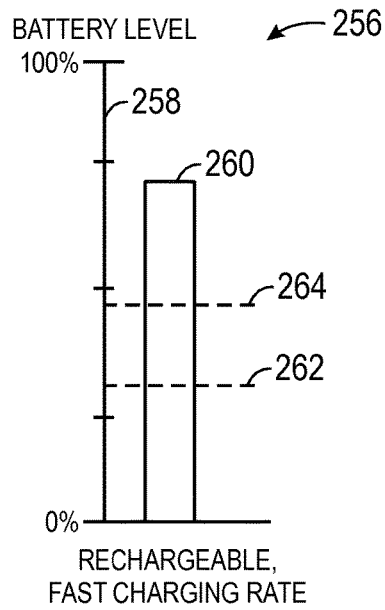
FIG. 10 is a schematic visualization of battery level thresholds for device-state-based message limiting for a rechargeable device with a fast charging rate, in accordance with an embodiment.
Figure 11:
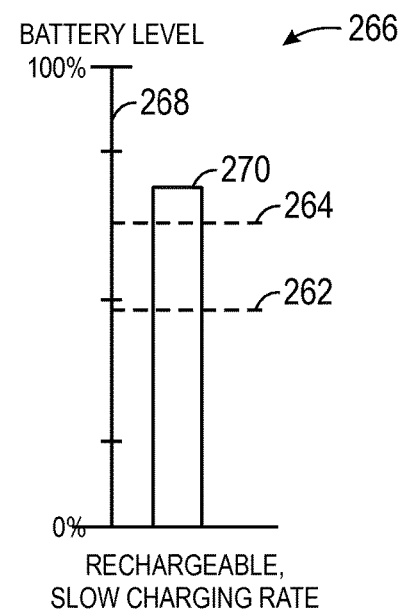
FIG. 11 is a schematic visualization of battery level thresholds for device-state-based message limiting for a rechargeable device with a slow charging rate, in accordance with an embodiment.
Figure 12:
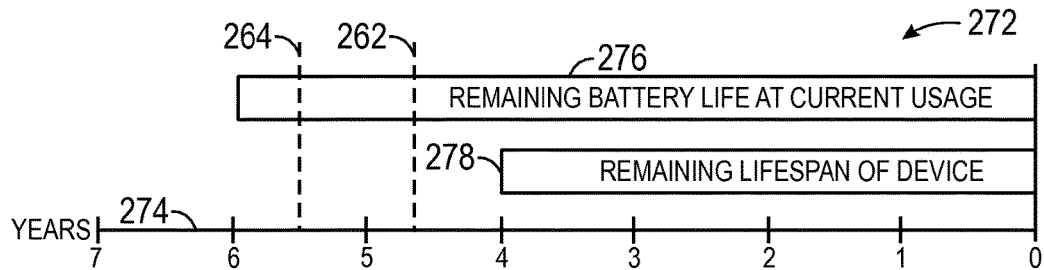
FIG. 12 is a schematic visualization of battery level thresholds for a non-rechargeable device, in accordance with an embodiment.

Briefly considering FIGS. 10-12 before continuing, the battery level 159 may be compared to a static threshold that is the same for all smart home devices 10, or may be compared to one or more battery level thresholds that may vary depending on other characteristics of the smart home device 10A, such as the charging rate 160, device age 161, and/or the planned lifespan 162 of the smart home device 10. For example, FIG. 10 illustrates battery level thresholds for a smart home device 10 with a rechargeable battery that charges at a relatively fast rate, while FIG. 11 illustrates battery level thresholds for a smart home device 10 with a rechargeable battery that charges at a relatively slower rate. FIG. 12 illustrates battery level thresholds that may vary depending on the age of the smart home device 10 and its planned lifespan.

In a battery level plot 256 of FIG. 10, a battery level 258 from 0% to 100% is shown next to a measured battery level 260 of the smart home device 10. In the example of FIG. 10, the battery is a rechargeable battery and the charging rate is relatively fast. A first threshold 262 may represent a minimum battery level to allow device update signals 158. A second battery level threshold 264 may represent a minimum battery level to allow for device update signals 158 without providing a warning message to third-party applications that future message may not go through because they may be limited due to a low battery level.

Likewise, in a battery level plot 266 of FIG. 11, a battery level 268 from 0% to 100% is shown next to a measured battery level 270. In FIG. 11, the thresholds 262 and 264 are shown to have been selected to be higher than those in FIG. 10. This is to account for the relatively slower charging rate of the battery of the associated target smart home device 10. Namely, to ensure that the operation of the smart home device 10 remains satisfactory, higher charging rates may correspond with higher thresholds 262 and/or 264, and vice-versa.

The battery level thresholds may be even higher for non-rechargeable batteries. FIG. 12 illustrates a plot 272 associated with a smart home device with a non-rechargeable battery. The plot 272 compares a total lifespan 274 in years to a remaining battery life 276 in years, and a remaining lifespan 278 of the target smart home device 10. The remaining lifespan 278 of the target smart home device 10 may be determined, for example, by comparing the device age 161 with the planned device lifespan 162. Regardless of how the remaining lifespan 278 is calculated, the remaining lifespan 278 may be used to determine the first threshold 262 and/or second threshold 264 to permit communication with the smart home device. That is, the thresholds 262 and/or 264 may be relatively higher when the smart home device 10 is younger than when it is older, to ensure that the smart home device 10 continues to operate as desired for its planned lifespan.

Returning to the flowchart 250 of FIG. 9, when the battery level 159 of the target smart home device 10 is not above the first threshold 262 (decision block 280), the device service 64 may return an error to the application service and/or application that submitted the device request (block 282). This is indicated in block 282 as an error for an immediate device request message, because longer-termed requests that are not time-sensitive may be held until the device service 64 determines that communication messages can be sent without reducing the satisfactory performance of the target smart home device 10.

If the battery level is above the first threshold 262 (decision block 280) but is not above the second threshold 264 (block 284), the device service 64 may issue the device update signal 158, but may provide a warning message to the application and/or application service that sent the device request message (block 286). When the battery level is above both the first threshold 262 (decision block 280) and the second threshold 264 (decision block 284), the device service 64 may issue the device update signal 158 without providing a warning (block 288). It should be appreciated that more or fewer thresholds may be employed, with varying levels of warnings. Moreover, the same decisions of the flowchart of FIG. 9 may be used to set a particular rate limit, rather than deciding whether to send a particular message. For example, when the battery level is below the first threshold 262, the rate limit may be set to be relatively low (e.g., 0 "buckets" (sessions) per minute), increasing as the battery level crosses the first threshold 262 (e.g., 12 "buckets" (sessions) per hour) and/or second threshold 264 (e.g., 1 "bucket" (session) per minute). Moreover, it should be appreciated that the flowchart 250 is provided by way of example, and that the blocks shown may be performed in other orders. For instance, the thresholds may be compared in different orders to determine whether or not to send a device update signal 158.

Figure 13:
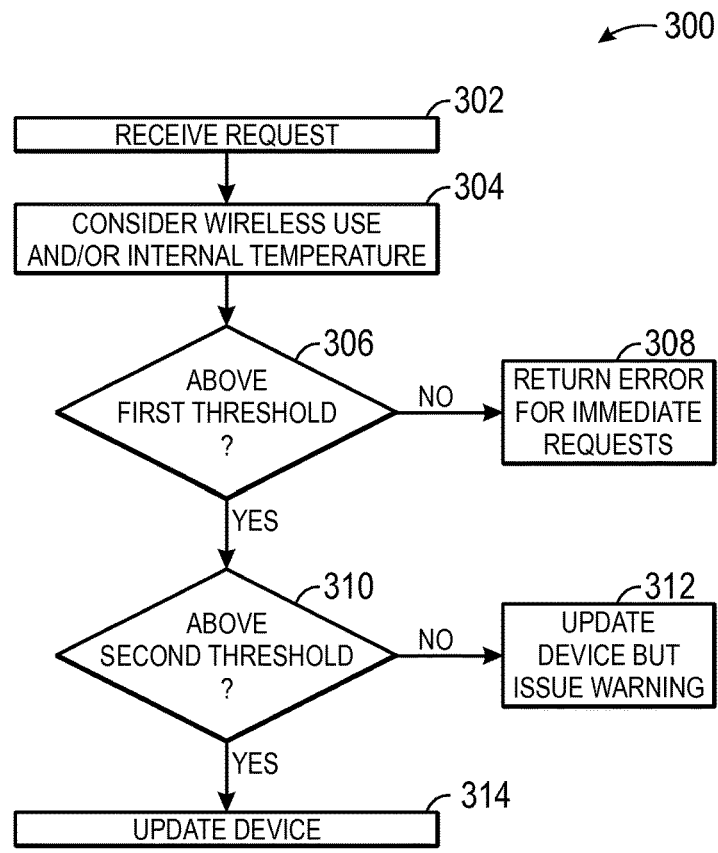
FIG. 13 is a flowchart of a method for performing device-state-based message limiting using wireless usage and/or the internal temperature of a smart home device, in accordance with an embodiment.

Because the wireless usage 163 and/or the internal temperature 164 could cause the target smart home device 10 (e.g., the target smart home device 10A of FIG. 5) to improperly sense properties of its surroundings, thereby inhibiting the user experience of the smart home device 10, a flowchart 300 of FIG. 13 describes a manner of message limiting to the target smart home device 10 when these characteristics are too high. In the example of FIG. 13, the device service 64 may receive a device request message (e.g., 144 or 150) (block 302). The device service 64 may consider the recent wireless usage 164 and/or the internal temperature 164 of the target smart home device 10. The device service may compare these characteristics to one or more threshold values in a similar manner to the comparison of battery level thresholds described in FIGS. 9-12.

For example, if the amount of recent wireless usage 163 and/or the internal temperature 164 is above a first threshold (decision block 306), the device service 64 may return an error message (block 308) and may not provide a device update signal 158. If the recent wireless usage 163 and/or the internal temperature 164 are above the first threshold (decision block 306) but below a second threshold (decision block 310), the device service 64 may issue the device update signal 158, but reply to the application or application service that sent the device request message with a warning that the temperature of the device is getting too high or is approaching an unsatisfactory limit (block 312). If the recent wireless usage 163 and/or the internal temperature 164 is above the first threshold (decision block 306) and the second threshold (decision block 310), the device service 64 may provide the device update signal 158 without issuing an warnings (decision block 314). Moreover, the same decisions of the flowchart of FIG. 13 may be used to set a particular rate limit, rather than deciding whether to send a particular message. For example, when the recent wireless usage 163 and/or the internal temperature 164 are below the first threshold 262, the rate limit may be set to be relatively low (e.g., 0 "buckets" (sessions) per minute), increasing as the recent wireless usage 163 and/or the internal temperature 164 cross the first threshold 262 (e.g., 12 "buckets" (sessions) per hour) and/or second threshold 264 (e.g., 1 "bucket" (session) per minute).

Figure 14:
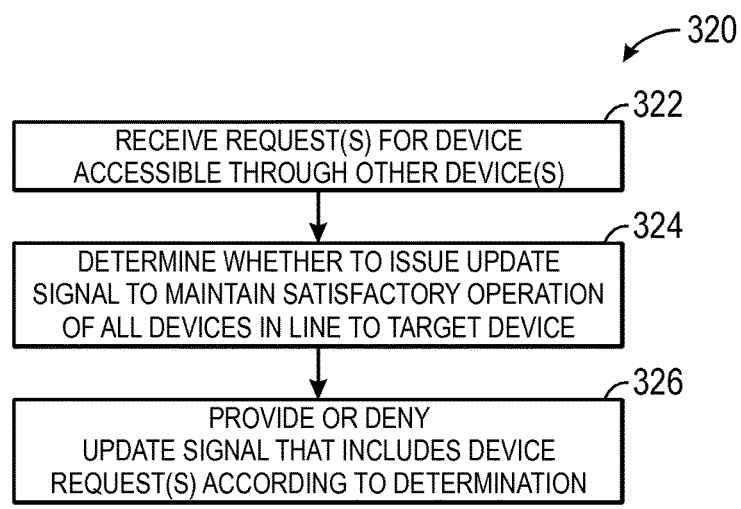
FIG. 14 is a flowchart of a method for performing device-state-based message limiting using device operation parameters of other connected electronic devices, in accordance with an embodiment.

As mentioned above, a target smart home device 10 (e.g., a target smart home device 10B) may be accessible by the device service 64 through another smart home device 10 (e.g., smart home device 10A). Since issuing messages to the target smart home device 10, in such a situation, could consume battery resources of intervening devices 10 and/or increase a wireless usage and/or a temperature of such intervening devices 10 (e.g., the smart home device 10A), the device service 64 may consider device operation status parameters associated not only with the target smart home device, but also in any intervening devices 10. In a flowchart 320 of FIG. 14, for example, the device service 64 may receive one or more request messages (e.g., 144 or 150) for a target smart home device 10 that is accessible by the device service 64 through another smart home device (e.g., the smart home device 10A) (block 322). The device service 64 may determine a rate limit that may maintain satisfactory operation of all of these smart home devices 10 (block 324). Thus, the device service 64 may determine to provide or not to provide the device update signal 158 according to the message limiting determination to maintain satisfactory operation of the target smart home device 10 (e.g., the smart home device 10B) and any intervening smart home devices (e.g., the smart home devices with the smart home device 10A) (block 326).

Rule-Based Rate Limiting

Additionally or alternatively to the device-state-based message limiting discussed above, the device service 64 (and/or one or more of the smart home devices 10) may perform rule-based rate limiting using the rule-based rate-limiting component 153. One example of a system 350 of using the rule-based rate-limiting component 153 appears in FIG. 15. As used in this disclosure, the term "rate limiting" refers to the act of selectively permitting a message 352 (e.g., from the applications 142 and/or 148) that is en route to a destination (e.g., another component of the device service 64 or to a target smart home device 10) to pass depending on various parameters 354 associated with the message 352. The rate limiting of this disclosure is referred to as "rule-based" because messages 352 may be restricted from passage based on rules relating to any suitable number of ascertainable parameters 354 of the messages 352.

A few non-limiting examples of these parameters 354 include an identifier of an instance of an application that sent the message (e.g., client_id), a user identifier associated with the message (e.g., user_id), an identifier of an electronic device that sent the message, an indication of a network location where the message was sent from (e.g., an Internet Protocol (IP) address), an indication of an organization associated with the application (e.g., a developer of the application, a company sharing a relationship such as a distribution agreement with the developer, a technical cooperation or standards organization, or an online application store where the application was sold, to name a few examples), a time when the message was sent or received, content of the message (e.g., whether the message is seeking to issue a command to change the operation of a smart home device 10 or merely to request information regarding the smart home device 10), a type of smart home device 10 to which the message pertains, a specific smart home device 10 to which the message pertains, and/or any other suitable parameter relating to the message. Rules incorporating one or more of these parameters may be used to selectively rate-limit messages according to the parameters of the messages.

Figure 15:
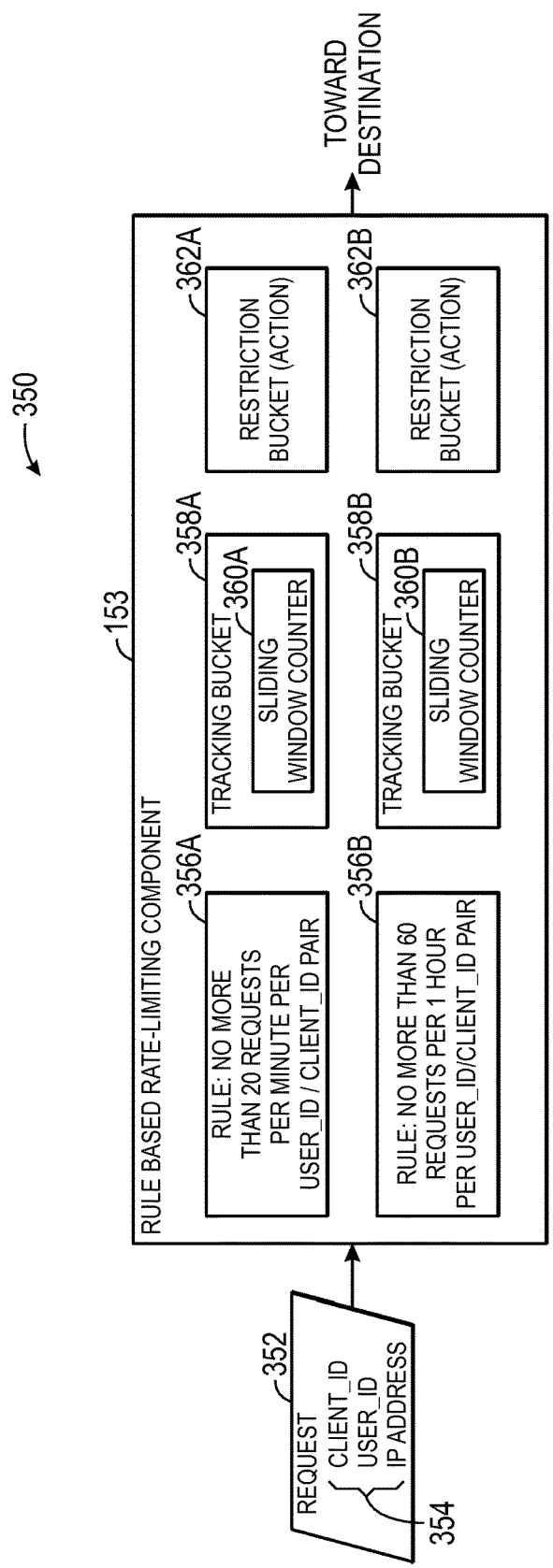
FIG. 15 is a block diagram of a rule-based rate-limiting system, in accordance with an embodiment.

The rule-based rate-limiting component 153 may include any suitable number of rules 356 based on any suitable parameters 354. In the example shown in FIG. 15, the rule-based rate-limiting component 153 includes a first rule 356A and a second rule 356B. It should be appreciated that the rules 356 shown in FIG. 15 are provided by way of example and are not intended to be exhaustive. Indeed, the rule-based rate-limiting component 153 may employ more or fewer rules 356, and these rules 356 may pertain to more or fewer parameters 354.

Continuing with the example of FIG. 15, the first rule 356A limits the number of messages 352 originating from a particular application instance/user pair to no more than 20 messages per minute. The second rule 356B limits the number of messages 352 originating from a particular application instance/user pair to no more than 60 messages per hour. Respective tracking buckets 358A and 358B that may contain respective sliding window counters 360A and 360B may maintain respective sliding window counts corresponding to the rules 356A and 356B. When the sliding window counter 360A exceeds the prescribed limit of the rule 356A (e.g., more than 20 messages within the last minute), a restriction bucket 362A may be generated, activated, and/or invoked to cause the rule-based rate-limiting component 153 to take a specified restrictive action upon receipt of a message 352 having a particular set of parameters 354 (e.g., originating from the application instance/user pair, though other parameters may be used in addition or alternatively to those of the rule 356A). Likewise, when the sliding window counter 360B exceeds the prescribed limit of the rule 356B (e.g., more than 60 messages within the last 2 hours), a restriction bucket 362B may be generated, activated, and/or invoked to cause the rule-based rate-limiting component 153 to take a specified restrictive action upon receipt of a message 352 having a particular set of parameters 354 (e.g., originating from the application instance/user pair, though other parameters may be used in addition or alternatively to those of the rule 356B). The restrictive action may involve blocking, delaying, and/or redirecting the message 352 and/or replying with an error or warning message.

Each restriction bucket 362 may be understood to operate as a "restriction flag." As used herein, the term "restriction flag" refers to a component that causes the rule-based rate-limiting component 153 to catch messages 352 having matching certain parameters 354 and to take certain restrictive action in relation to those messages 352. The term "restriction flag" and "restriction buckets" will be used interchangeably in this disclosure. It should be noted that the restriction buckets 362A and 362B are shown in FIG. 15 as separate from the tracking buckets 358A and 358B. As will be discussed further below, this may allow the restriction of messages 352 to take place synchronously to their receipt. By contrast, the determination of whether to restrict the messages 352 (e.g., by tracking certain messages 352 with a tracking bucket 358 and generating or activating the restriction bucket 362 when the number of messages 352 exceeds a limit) may take place asynchronously to the receipt of the messages 352. As a result, the latency associated with tracking the messages 352 may be at least partially dissociated from the latency associated with restricting the messages 352.

As noted above, the sliding window counters 360 (e.g., 360A or 360B) of the rule-based rate-limiting component 153 may progressively track the total number of messages 352 that match particular criteria (e.g., have the same parameters 354 as those listed in a rule 356). As such, the counts stored in sliding window counters 360 may change over time. One example of the manner in which sliding window counters 360 may adjust their counts of messages 352 having particular parameters 354 is provided in FIGS. 16A and B.

In FIGS. 16A and B, dots representing messages 352 appear on a timeline 392 representing time from 8:00 AM to midnight. In FIG. 16A, the time is currently 10:00 PM. The messages 352 are understood all to have a particular set of parameters 354 (e.g., originating from the same particular application instance and associated user). Moreover, in the example of FIGS. 16A and B, the rule-based rate-limiting component 153 is understood to be counting the messages 352 based on the rules 356A and 356B shown in FIG. 15. To recall, these rules 356 limit messages 352 from a single application instance/user pair to (1) no more than 20 messages per minute (rule 356A) and (2) no more than 60 messages per hour (rule 356B). As such, FIGS. 16A and B show the first sliding window counter 360B, which represents a count of all such messages 352 that have been received within the last minute, and the second sliding window counter 360B, which represents a count of all such messages 352 that have been received in the last hour.

In the example of FIG. 16A, the sliding window counter 360A contains a count of 5 (within the allowable limit of 20), but the sliding window counter 360B contains a count of 66 (above the allowable limit of 60). Thus, the rule-based rate-limiting component 153 may take a restrictive action for additional messages 352 that are received while the sliding window counter 360B remains above the limit of its corresponding rule 356B.

Over time, however, the counts of the sliding window counters 360A and 360B may change. Indeed, the effect of aging out the counts of the messages 352 is evident in FIG. 16B, which shows the counts of the sliding window counters 360A and 360B at 11:00 PM. Now, the sliding window counter 360A contains a count of 6 (within the allowable limit of 20) and the sliding window counter 396 contains a count of 42 (also within the allowable limit of 60). Accordingly, if there are not other rules 356 pertaining to the messages 352, the rule-based rate-limiting component 153 may no longer be taking a restrictive action for additional messages 352.

Figure 17:
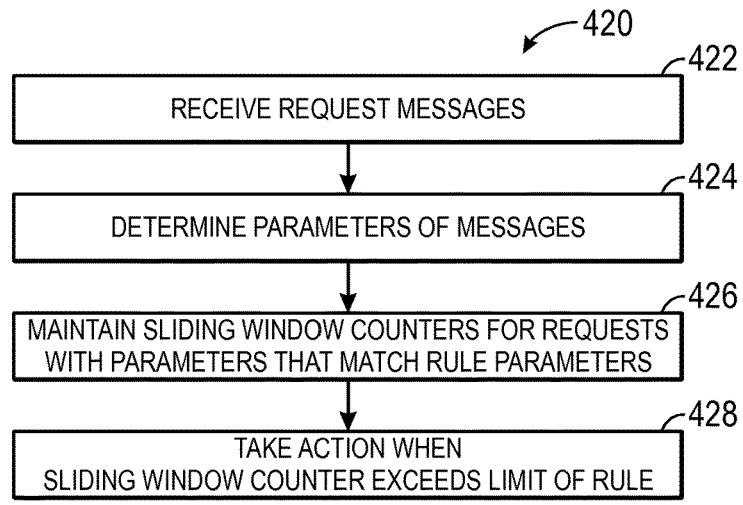
FIG. 17 is a flowchart of a method for rule-based rate limiting to take action when a sliding window counter exceeds some limit, in accordance with an embodiment.

Thus, one example of the rule-based rate-limiting component 153 may operate as described in a flowchart 420 of FIG. 17. Namely, the rule-based rate-limiting component 153 may receive a request message 352 (block 422) and determine parameters 354 relating to the message 352 (block 424). The rule-based rate-limiting component 153 may compare the parameters 354 of the message 352 to those of any currently active rules 356 and maintain a sliding window count of those messages 352 (block 426). When the sliding window count exceeds a limit of a rule 356, the rule-based rate-limiting component 153 may take a restrictive action (e.g., blocking, delaying, or redirecting a message 352, or issuing a warning or error when another such message 352 is received) (block 428).

Before continuing, a brief example of rules and restrictions written in pseudocode are provided. An example of a rule 356 may be as follows:

```
{
    "id" : 12,
    "parameters" : ["client_id" (bound), "user_id" (bound),
    "time_of_day"],
    "expression" : "&1, &2, &3 between 12am and 4am"
}
```

An example of a restriction bucket 362 based on the rule 356 may be as follows:

```
{
    "rule" : 12,
    "parameters" : ["client_id" : 123, "user_id" : 8],
    "action" : reject
}
```

In the example pseudocode above, any request for user 8 and client 123 will be rejected at any time between midnight and 4:00 AM. Both rules 356 and restriction buckets 362 may be loaded by a filter on start-up, but may also be updated dynamically at runtime. This may be relatively frequent in the case of the restriction buckets 362, since they may be due to a sliding window counter 360 exceeding some limit.

Figure 18:
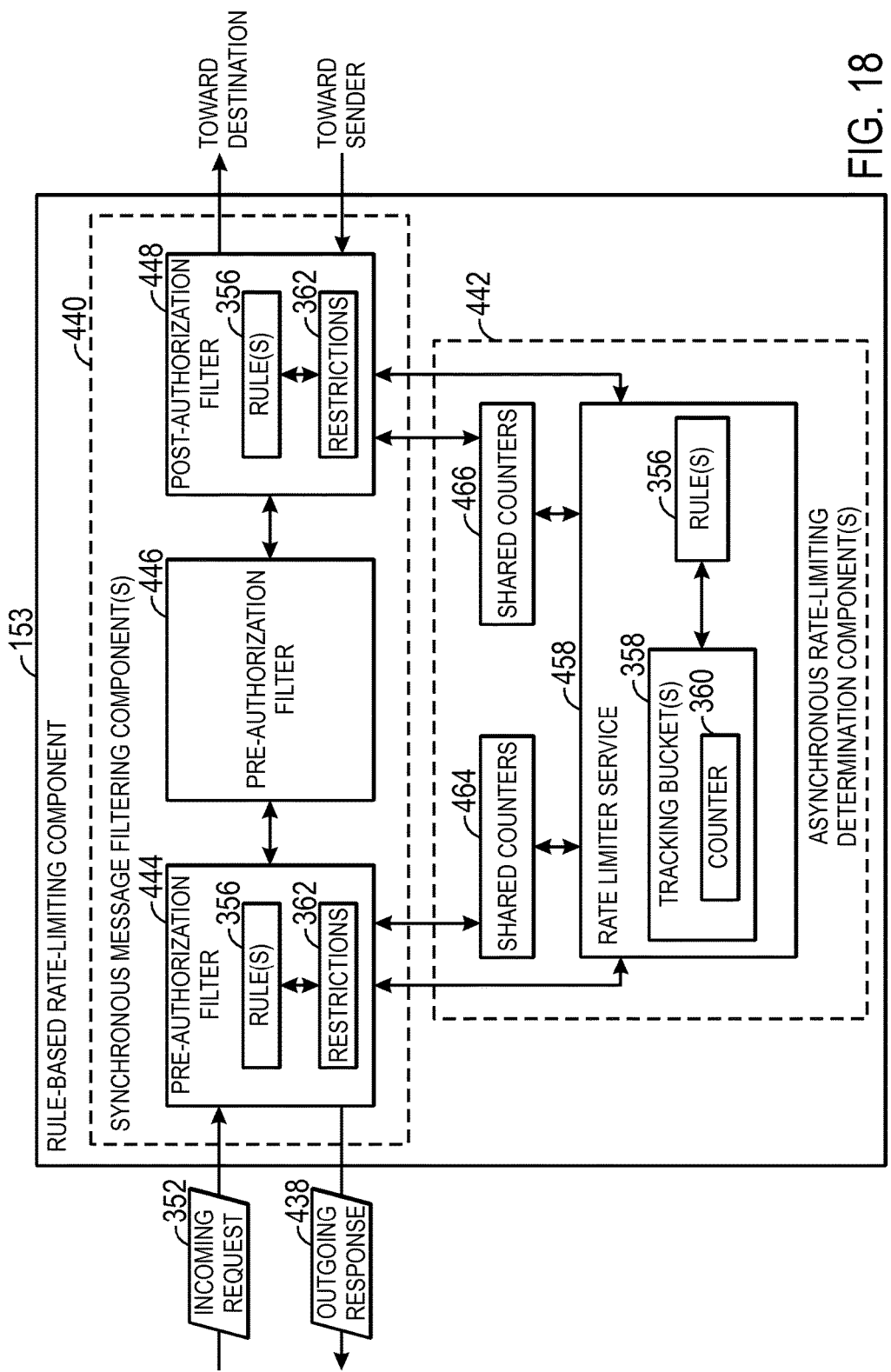
FIG. 18 is a block diagram of one example of the arrangement of components that may be used by the rule-based rate limiting system, in accordance with an embodiment.

In some examples, the rule-based rate-limiting component 153 may have an organizational structure that reduces the latency incurred in filtering the messages 352. As seen in FIG. 18, the rule-based rate-limiting component 153 may receive the incoming request messages 352 en route to a destination and provide outgoing responses 438 (e.g., a response from the destination or a warning or error message from the rule-based rate-limiting component 153). To reduce latency incurred in filtering the messages 352, the example of the rule-based rate-limiting component 153 of FIG. 18 includes one or more synchronous message filtering components 440 and one or more asynchronous rate-limiting determination components 442. The synchronous message filtering component(s) 440 may identify messages 352 having parameters targeted for some restrictive action, while the asynchronous rate-limiting determination component(s) 442 may control the synchronous message filtering component(s) 440. In this way, latency incurred by tracking the messages 352 may have less of an impact on the filtering of the messages 352.

In the example of FIG. 18, the synchronous messages filtering component(s) 440 include a pre-authorization filter 444, an authorization filter 446, and a post-authorization filter 448. The asynchronous rate-limiting determination component(s) 442 include a rate limiter service 458 and/or shared counters 464 and 466, and may update the pre-authorization filter 444 and post-authorization filter 448. It should be appreciated, however, that this is intended to be merely one example of the rule-based rate-limiting component 153. Indeed, more or fewer synchronous message component(s) 440 may be used, and the synchronous message component(s) 440 may be called or removed as desired. It may be noted that the shared counters 464 and 466 may be used in a form of circuit-breaker type of rate limiting to prevent a misbehaving client from putting through a large number of requests before they are blocked by an asynchronous restriction. That is, in some embodiments, the synchronous message filtering component 440 may perform certain counts of large numbers of quickly received messages 352 from a particular source using the shared counters 464 and 466.

When the synchronous message filtering component 440 includes the pre-authorization filter 444 and the post-authorization filter 448, the pre-authorization filter 444 may take restrictive action based on parameters 354 that can be determined without first authorizing the messages 352. By contrast, the post-authorization filter 448 may take restrictive action based on parameters 354 that can be determined after authorizing the messages 352. For example, a parameter 354 such as the network location (e.g., IP address) that the message 352 was sent from may be ascertainable without authorizing the message 352, while parameters 354 such as the application instance and/or user may be ascertainable only after authorization.

The pre-authorization filter 444 and the post-authorization filter 448 may compare certain parameters 354 of the messages 352 according to one or more rule(s) 356 and may have any suitable filter structure. For example, in one example, the structure may be that of a Finagle filter or Netty channel handler, or both. The rule(s) 356 of the pre-authorization filter 444 may be the same as or different from the rule(s) 356 of the post-authorization filter 448. For instance, the rule(s) 356 of the pre-authorization filter 444 may include, for example, taking restrictive action based on a number of messages received from a particular IP address within a specified amount of time. The rule(s) 356 of the post-authorization filter 448 may include, for example, taking restrictive action based on a number of messages received from a particular instance of an application and/or user within a specified amount of time.

The pre-authorization filter 444 and the post-authorization filter 448 may not actively track the number of messages 352 having parameters 354 that match the rules 356. Rather, the pre-authorization filter 444 and the post-authorization filter 448 may compare the parameters 354 of the messages 352 to those of the rules 356 and indicate that such messages 352 have been received to the rate limiter service 452 and/or the shared counters 464 and 466. The rate limiter service 458 then may maintain tracking buckets 358 and sliding window counters 360 (which may correspond to the shared counters 464 or 466 in some embodiments) based on these indications. The rate limiter service 458 may maintain the tracking buckets 358 and sliding window counters 360 according to one or more rules 356, which may or may not correspond to the rule(s) 356 of the pre-authorization filter 444 or post-authorization filter 448.

When the sliding window counter 360 of a tracking bucket 358 exceeds a limit set by a corresponding rule 356 in the rate limiter service 458, the rate limiter service 458 may generate or activate a corresponding restriction bucket 362 in the pre-authorization filter 444 or post-authorization filter 448. For example, there may be a rule 356 (e.g., 356A) not to exceed 20 messages per minute from a particular application instance/user pair. When this happens, the rate limiter service 458 may generate or activate a corresponding restriction bucket 362 in the post-authorization filter 448, thereby setting a restriction flag for the post-authorization filter 448 to take restrictive action when a corresponding message 352 is next received. Since maintaining the sliding window count involves some processing, by doing this asynchronously in the rate limiter service 458 rather than synchronously in the post-authorization filter 448, the latency involved in filtering the messages 352 may be reduced.

Figure 19:
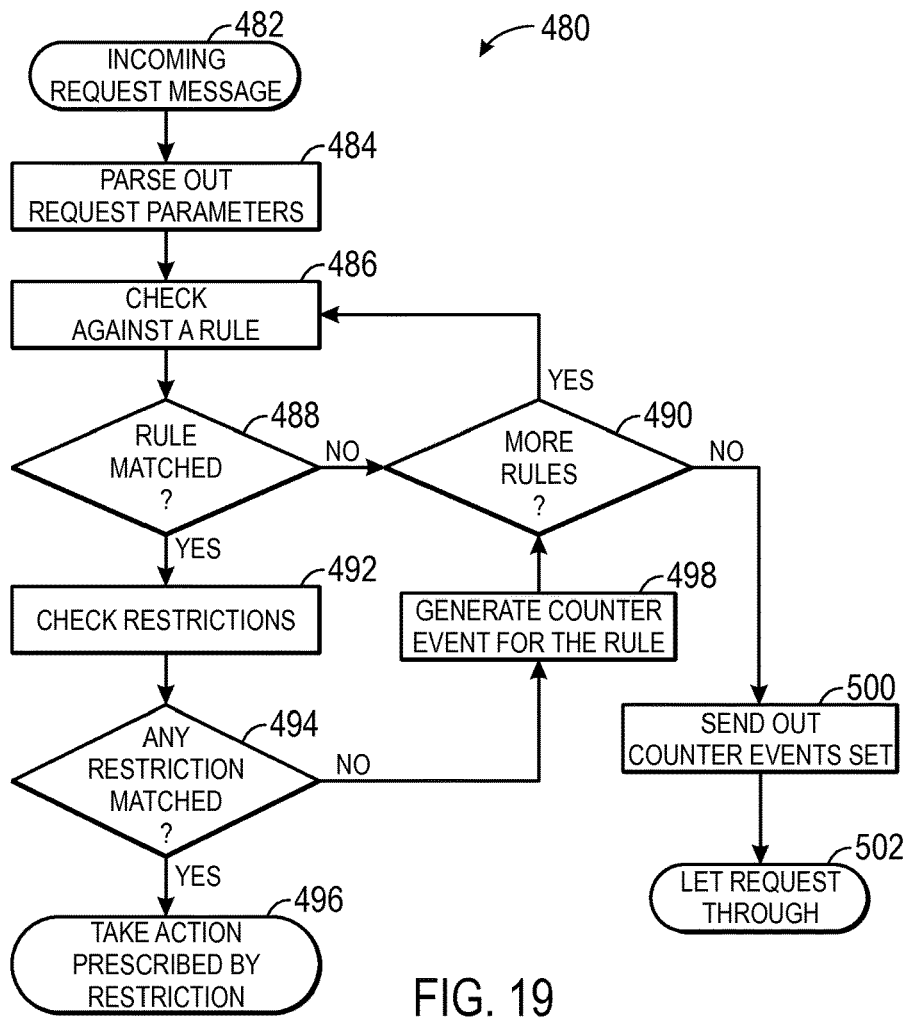
FIG. 19 is a flowchart of a method for synchronously determining to take or not to take an action when an incoming request message is received, in accordance with an embodiment.

Thus, the synchronous message filtering component(s) 440 may operate at least in part according to a flowchart 480 of FIG. 19. Upon receipt of an incoming request message 352 (block 482), one or more of the synchronous message filtering component(s) 440, such as the pre-authorization filter 444 or the post-authorization filter 448, may parse one or more parameters 354 pertaining to the message 352 (block 484). The parameters 354 of the message 352 may be checked against parameters 354 of a rule 356 (block 486). While the parameters 354 do not match (decision block 488) and there are more rules 356 (decision block 490), the synchronous message filtering component(s) 440 may continue to check against rules 356 (block 486) until a match is found (decision block 488) or until there are no more rules 356 to compare (decision block 490).

When the parameters 354 of the message 352 do match the parameters 354 of a rule 356 (decision block 488), the synchronous message filtering component(s) 440 may check whether that implicated rule 356 is associated with any active restriction buckets 362 (block 492). If so (decision block 494), the synchronous message filtering component(s) 440 may take the action prescribed by the restriction bucket 362 and/or rule 356 (block 496). On the other hand, if the implicated rule 356 is not associated with any active restriction buckets 362 (decision block 494), the synchronous message filtering component(s) 440 may generate a counter event associated with the rule 356 (block 498).

After generating and/or sending the counter event at block 498, the synchronous message filtering component(s) 440 may continue to check against rules and carry out blocks 490, 486, 488, 492, 494, 498, until there are no more rules (decision block 490). At this point, the synchronous message filtering component(s) 440 may send indications of the counter events that have been generated to the asynchronous rate-limiting determination component(s) 442 (block 500) and allow the message 352 to pass (block 502). As noted above, the asynchronous rate-limiting determination component(s) 442, such as the rate limiter service 458, may use these counter events to maintain corresponding tracking buckets 358 and determine whether to cause restriction buckets 362 to be generated or activated in the synchronous message filtering component(s) 440. In this way, message restriction may take place synchronously to the receipt of the messages 352 while the determination of whether to restrict the messages 352 may take place asynchronously.

Figure 20:
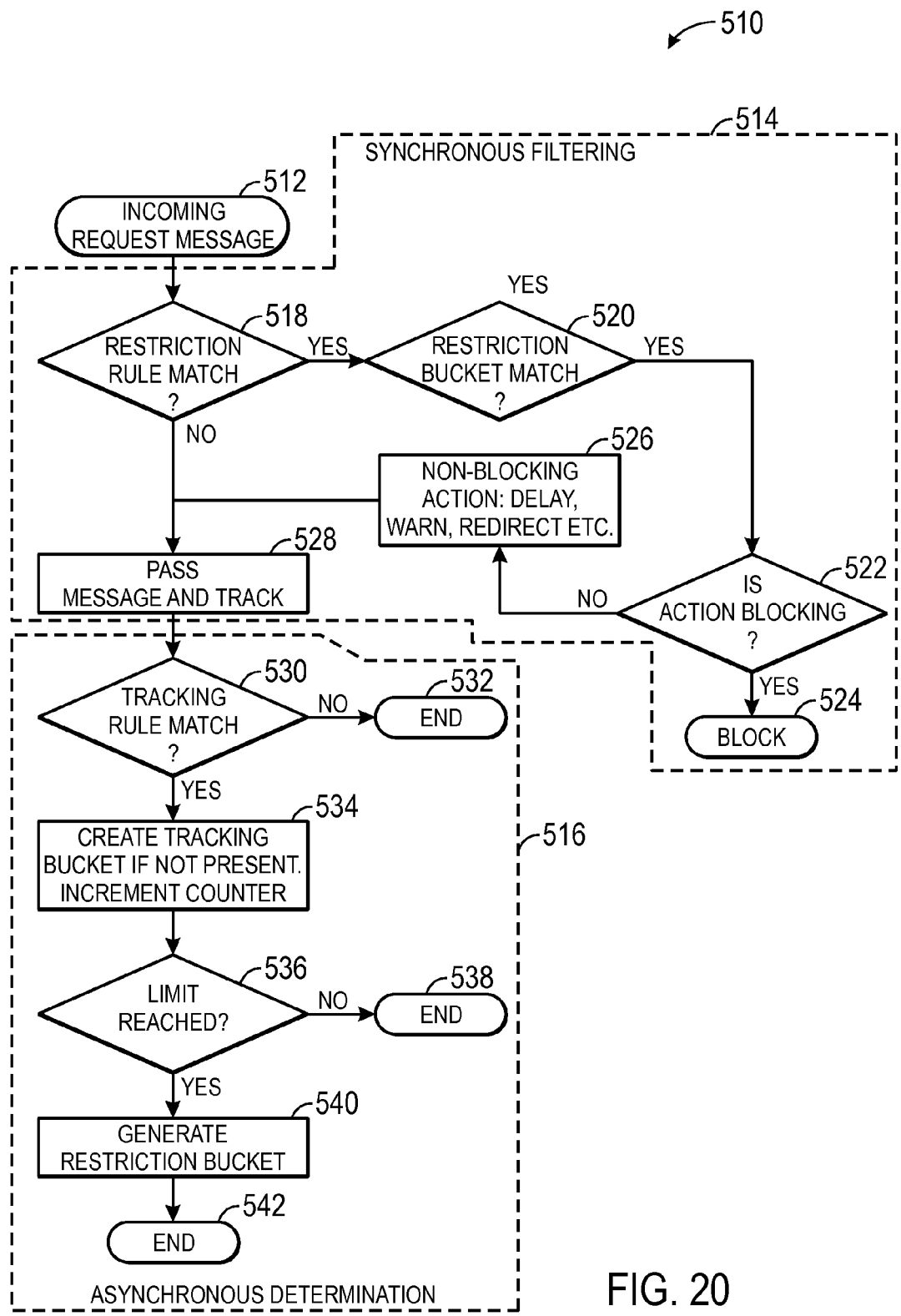
FIG. 20 is a flowchart of a method for synchronously filtering a message and asynchronously updating a filter, in accordance with an embodiment.

One example of the overall operation of the rule-based rate-limiting component 153 appears in a flowchart 510 of FIG. 20. Upon receipt of a message 352 (block 512), the rule-based rate-limiting component 153 may perform synchronous filtering (blocks 512) and asynchronous rate-limiting determination (blocks 514). Namely, as noted above, the rule-based rate-limiting component 153 may determine whether the parameters 354 of the message 352 match those of any restriction rules 356 (decision block 518) and, if so, the rule-based rate-limiting component 153 may determine whether there is a corresponding active restriction bucket 362 (decision block 520). If there is a corresponding active restriction bucket 362, the rule-based rate-limiting component 153 may take a restrictive action as prescribed by the restriction rule 356 or the restriction bucket 362. If the restrictive action is a blocking action (decision block 522), the message 352 may be blocked (block 524). Otherwise, the rule-based rate-limiting component 153 may take a corresponding non-blocking action, such as delaying or redirecting the message 352, or issuing a warning or error message in reply. Thereafter, the rule-based rate-limiting component 153 may pass the message 528 and/or track the message 352 against tracking rules 356.

For example, if there are no tracking rules 356 (decision block 530), the flowchart 510 may end (block 532). Otherwise, the rule-based rate-limiting component 153 may create a tracking bucket 358 if not yet generated and increment a corresponding sliding window counter 360 (block 534). If a limit has not been reached in the sliding window counter 360 (decision block 536), the flowchart 510 may end (block 538). If a limit has been reached in the sliding window counter 360 (decision block 536), the rule-based rate-limiting component 153 may generate or activate a restriction bucket 362 (block 540) and the flowchart 510 may end (block 542).

Figure 21:
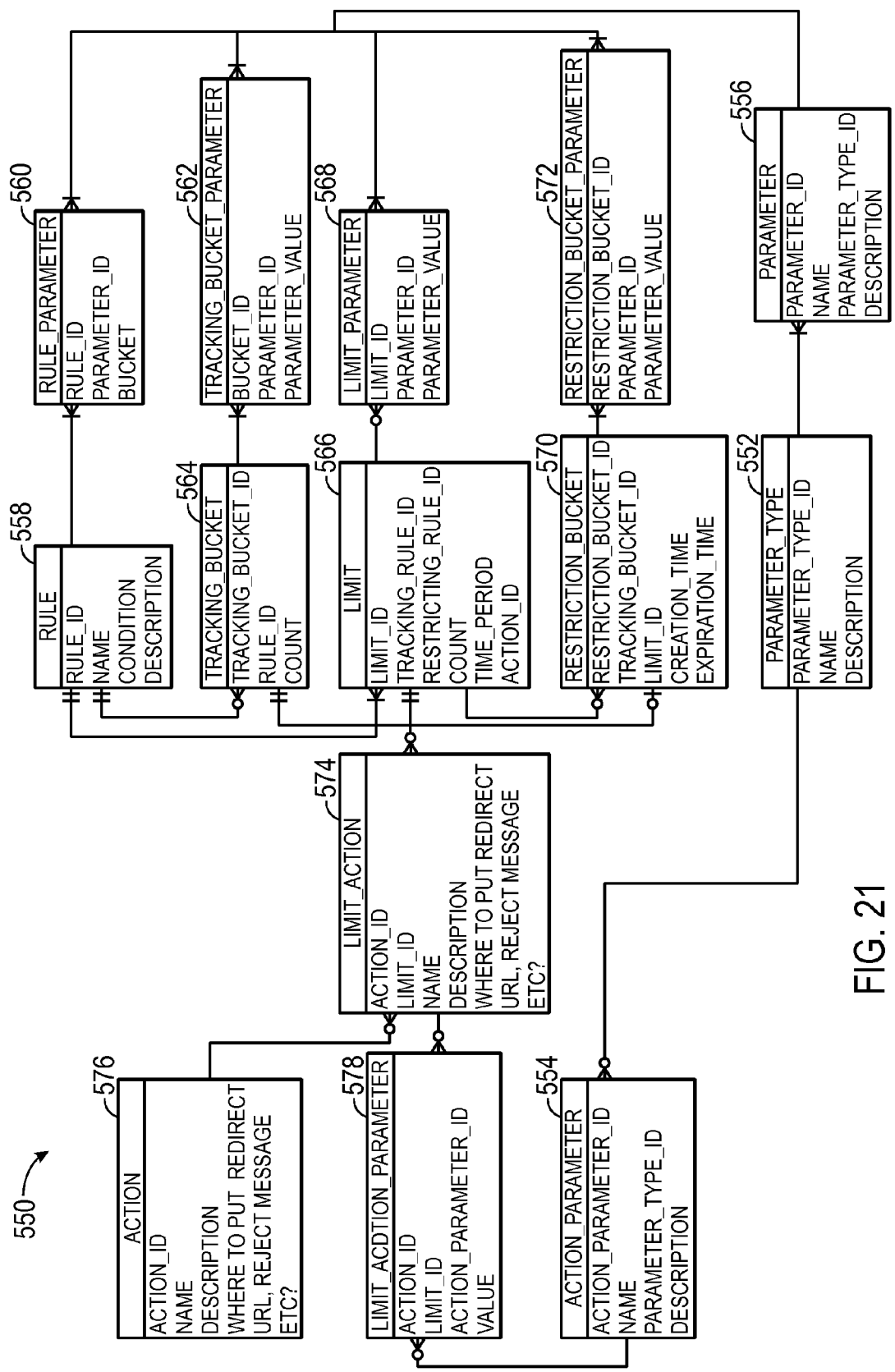
FIG. 21 is an object data model that relates various system components that may be used to create the rule-based rate limiting system of FIG. 18, in accordance with an embodiment.

An object data model 550 that may be used to carry out the rule-based rate-limiting component 153 appears in FIG. 21. The object data model 550 illustrates a variety of components (e.g., objects) that may be called in carrying out the rule-based rate-limiting component 153 and their relationships. The object data model 550 uses crow's foot notation. It should be understood that the object data model 550 merely represents one particular manner of carrying out the rule-based rate-limiting component 153.

The various components of the object data model 550 of FIG. 21 includes a parameter type component 552, which may include a parameter type identifier, a name, and a description. The parameter type component 552 may be used by zero or more action parameter components 554 and one or more parameter components 556. The action parameter components 554 may have an action parameter identifier, a name, the parameter type identifier to which it pertains, and a description. The parameter components 556 may have a parameter identifier, a name, the parameter type identifier to which it pertains, and a description.

Each rule component 558 may be associated with one or more rule parameter components 560. The rule components 558 may include a rule identifier, a name, a condition defining the rule, and a description. Although not expressly shown in FIG. 21, the rule components 558 may be tracking rule components having tracking rule identifiers or restriction rule components having restriction rule identifiers. The rule parameter components 560 may also be associated with a tracking bucket parameter component 562. The rule parameter components 560 thus may include a rule identifier, parameter identifier, and a tracking bucket identifier to which they pertain. Each tracking bucket parameter component 562 may include a bucket identifier, a parameter identifier to which it pertains, and parameter value that is being tracked. One or more tracking bucket parameter components 562 may pertain to a tracking bucket component 564. The tracking bucket components 564 may each include a tracking bucket identifier, a rule identifier to which it pertains, and a sliding window count. Each tracking bucket component 564 pertains to one and only one rule component 558, but each rule component 558 may pertain to zero or more tracking bucket components 564.

Limit components 566 may be associated with zero or more limit parameter components 568. The limit components 566 may each be identified by a tracking bucket identifier and may include a tracking rule identifier, a restricting rule identifier, a count value, a time period, and an action identifier (discussed further below). The limit component 566 may pertain to zero or more limit parameter components 568, which may include a limit identifier to which it pertains, a parameter identifier to which it pertains, and a parameter value.

A restriction bucket component 570 may pertain to a limit component 566 or to a tracking bucket component 564. Each restriction bucket component 570 may have a restriction bucket identifier and may include a tracking bucket component to which it pertains, a limit identifier to which it pertains, a creation time, and an expiration time. One or more restriction bucket parameter component 572 may pertain to each restriction bucket component 570. Each restriction bucket parameter component 572 may include a restriction bucket identifier to which it pertains, a parameter identifier to which it pertains, and a parameter value.

One or more limit action components 574 may be associated to each limit component 566. There may be zero or more limit action components 574 associated with a given action component 576. The action component 576 may include an action identifier, a name, a description, and an action (e.g., block message, redirect to a particular network address, and so forth). The limit action component 574, zero or more of which may pertain to an action component 576 and a limit component 566, thus may be identified by both an action identifier and a limit identifier. The limit action component 566 may include a name, a description, and an indication of the action to take (e.g., block message, redirect to a particular network address, and so forth). Zero or more limit action components 578 may pertain to a limit action component, and may include an action identifier, a limit identifier, an action parameter identifier, and a value at which to take action.

It should be appreciated that the object data model 550 represents only one data model that may be used to construct the rule-based rate-limiter component 153. Indeed, although the object data model 550 may enable a modular and highly extendable way of implementing the rule-based rate-limiter component 153, the rule-based rate-limiter component 153 may be constructed using less modular and less extendable components.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for providing a sending device with access to a target smart home device that is remote from the sending device via a server system comprising:
   receiving, at the server system and from the sending device, a command directed to the target smart home device;
   receiving, at the server system and from the target smart home device, one or more device operation status parameters of the target smart home device, the one or more device operation status parameters of the target smart home device comprising:
   a battery charging rate of the target smart home device;
   an age of the target smart home device;
   a planned lifespan of the target smart home device;
   a recent wireless usage of the target smart home device;
   an internal temperature of the target smart home device; or
   any of the above in relation to an intervening device over which communication to the target smart home device travels; or
   any combination thereof; and
   determining whether to communicate the command to the target smart home device based on the one or more device operation status parameters; and
   communicating the command to the target smart home device when it is determined to communicate the command to the target smart home device.

2. The method of claim 1, wherein the one or more device operation status parameters of the target smart home device further comprises a battery level of the target smart home device, and wherein the one or more device operation status parameters are used to determine whether to communicate the command via an update signal by:
   determining whether the battery level exceeds a first threshold; and
   determining not to provide the update signal when the battery level does not exceed the first threshold.

3. The method of claim 2, comprising, when the battery level does not exceed the first threshold, responding to the sending device with an error message.

4. The method of claim 2, comprising, when the battery level exceeds the first threshold, determining to communicate the command.

5. The method of claim 2, comprising:
   when the battery level exceeds the first threshold but does not exceed a second threshold higher than the first threshold, determining to communicate the command and responding to the command sending device with a warning message; and
   when the battery level exceeds the first threshold and the second threshold higher, determining to send provide the update signal without responding to the command or information sending device with the warning message.

6. The method of claim 2, comprising determining the first threshold based at least in part on the battery charging rate of the target smart home device, the age of the target smart home device, or the planned lifespan of the target smart home device, or any combination thereof.

7. A tangible, non-transitory computer-readable medium comprising instructions to:
   receive, from a sending device, a device request message targeted to a target smart home device accessible via a server system running on one or more different electronic devices;
   determine a first battery threshold based at least in part on a charging rate of a battery of the target smart home device, the charging rate being indicative of a current rate at which the battery of the target smart home device is charging;
   compare a battery level of the target smart home device with the first battery threshold;
   determine whether to communicate the device request message to the target smart home device based on the battery level, a determination to communicate the device request message only occurring when the battery level exceeds the first threshold; and
   communicate, via the server system, the device request message to the target smart home device when the battery level exceeds the first threshold.

8. The computer-readable medium of claim 7, wherein the first battery threshold is determined to be relatively higher when the charging rate is relatively higher and the first battery threshold is determined to be relatively lower when the charging rate is relatively lower.

9. The computer-readable medium of claim 7, comprising instructions to receive an operation status message deriving from the target smart home device, wherein the operation status message indicates at least the battery level and the charging rate of the battery of the target smart home device.

10. The computer-readable medium of claim 9, comprising, after receiving the device request message, instructions to poll the target smart home device with a request that the target smart device send the operation status message.

11. The computer-readable medium of claim 9, comprising occasionally polling the target smart home device with a request that the target smart device send the operation status message.

12. The computer-readable medium of claim 9, comprising periodically polling the target smart home device with a request that the target smart device send the operation status message.

13. The computer-readable medium of claim 7, comprising instructions to:
determine a second battery threshold higher than the first battery threshold;
compare the battery level of the target smart home device to the second battery threshold; and
when the battery level of the target smart home device exceeds the first battery threshold but not the second battery threshold, providing a warning message to an originating application or application service that sent the device request message to the server system.

14. The computer-readable medium of claim 7, comprising instructions to:
rate-limit the request at least by:
determining one or more parameters of the device request message;
determining whether the one or more parameters of the device request message match one or more parameters of a first restriction rule that specifies taking a first action when more than a first number of device request messages having the one or more parameters are received with a first amount of time; and
when the one or more parameters of the device request message match the one or more parameters of the first restriction rule:
incrementing a first sliding window counter associated with the first restriction rule, wherein the first sliding window counter indicates a total number of device request messages that have been received with the first amount of time that have one or more parameters that match the one or more parameters of the first restriction rule;
determining whether the first sliding window counter exceeds the first number of device request messages; and
when the first sliding window counter exceeds the first number of device request messages taking the first action.

15. An electronic device that is configured to operate as a smart home device, the electronic device comprising:
a sensor to sense a property of a smart home environment;
a processor to vary an operation of the electronic device based at least in part on the property sensed by the sensor; and
a network interface to communicate over a network with a server system, the communication with the server system comprising sending an outgoing message that includes one or more operation status parameters of the electronic device and receiving an incoming control message from the server system at a rate limited that is based at least in part on the one or more operation status parameters, the rate limited control message being at least partially derived from a message from another device connected to the server system and the outgoing message is configured to cause the server system to control access to the electronic device by the other device.

16. The electronic device of claim 15, comprising a rechargeable battery having a battery level of remaining battery life, wherein the one or more operation status parameters comprises the battery level and wherein the network interface is configured to receive the incoming control message from the server system at the rate limited based at least in part on the one or more operation status parameters, wherein the rate is limited to prevent the rechargeable battery from fully discharging.

17. The electronic device of claim 16, wherein the one or more operation status parameters comprise a charging rate of the rechargeable battery and wherein the network interface is configured to receive the incoming control message from the server system at the rate limited based at least in part on the one or more operation status parameters, wherein the rate is limited to prevent the rechargeable battery from fully discharging.

18. The electronic device of claim 15, comprising a non-rechargeable battery having a battery level of remaining battery life, wherein the one or more operation status parameters comprise the battery level and one or more indications of a remaining expected lifespan of the electronic device and wherein the network interface is configured to receive the incoming control message from the server system at the rate limited based at least in part on the one or more operation status parameters, wherein the rate is limited to prevent the battery from fully discharging before an end of the expected lifespan of the electronic device.

19. The electronic device of claim 15, wherein:
the sensor is configured to detect a temperature of the environment; and
the network interface comprises a wireless network radio used in communicating with the server system and wherein the one or more operation status parameters comprise an indication of recent usage of the wireless network radio and the network interface is configured to receive the incoming control message from the server system at the rate limited based at least in part on the one or more operation status parameters, wherein the rate is limited to prevent an internal temperature of the electronic device from exceeding a threshold temperature beyond which the sensor is less likely to correctly detect the temperature of the environment.

20. The electronic device of claim 15, wherein the electronic device comprises a thermostat, a hazard detector, a smart doorbell, a security system, an irrigation system, a smart television, a sound sensor, or any combination thereof.

21. A method comprising:
receiving in a server system:
from a first program or first program service associated with the first program of a first requesting device, a first device request message targeted to an electronic smart home device accessible via the server system; and
from a second program or second program service associated with the second program of a second requesting device, a second device request message targeted to the electronic smart home device accessible via the server system;
determining, in the server system and based at least in part on one or more operation status parameters, whether to communicate an update signal that incorporates the first and second device request messages from the first and second requesting device to the electronic smart home device, the one or more operation status parameters comprising:
  a battery charging rate of the electronic smart home device;
  an age of the electronic smart home device;
  a planned lifespan of the electronic smart home device;
  a recent wireless usage of the electronic smart home device;
  an internal temperature of the electronic smart home device; or
  any of the above in relation to an intervening electronic smart home device over which communication to the electronic smart home device travels; or
  any combination thereof.

22. The method of claim 21, wherein the server system runs a cloud service, and wherein the server system is not in a local area network that includes the electronic smart home device.

23. The method of claim 21, wherein the server system runs a cloud service, and wherein the server system is in a local area network that includes the electronic smart home device.

24. The method of claim 21, wherein the one or more operation parameters comprises the internal temperature or the recent wireless usage of the electronic smart home device, wherein whether to provide or not to provide the update signal comprises:
  comparing:
    the internal temperature of the electronic smart home device with a first temperature threshold; or
    the recent wireless usage of the electronic smart home device with a first wireless usage threshold; or
    a combination thereof; and
  determining to provide the update signal only when:
    the internal temperature does not exceed the first temperature threshold; or
    the recent wireless usage does not exceed the first wireless usage threshold; or
    a combination thereof.

25. The method of claim 21, comprising:
  determining whether to rate-limit the first and second request messages by:
    receiving the first and second request messages, wherein each of the request messages comprises one or more message parameters;
    synchronously to the receipt of the request messages, filtering the request messages as the request messages are received using one or more parameterized filters, wherein the one or more parameterized filters are configured to take an action on a request message having message parameters that match corresponding parameters of one or more first rules; and
    asynchronously to the receipt of the request messages, update the one or more parameterized filters based at least in part on one or more respective counts of request messages having message parameters that match corresponding parameters of one or more second rules.

26. An electronic device that is configured to operate as a smart home device, the electronic device comprising:
  a sensor to sense a property of a smart home environment;
  a processor to vary an operation of the electronic device based at least in part on the property sensed by the sensor and determine when to limit external communication with the electronic device based at least in part on one or more operation status parameters of the electronic device; and
  a network interface to communicate over a network with a server system, wherein to communicate with the server system comprises sending an outgoing message that includes an indication of the rate limit configured to at least partially limit update messages derived from a message from another device connected to the server system to cause the server system to control access to the electronic device by the other device.

27. The method of claim 1, wherein the device operation status parameters are received in response to receiving the command or information.

* * * * *